(12) United States Patent
Yang et al.

(10) Patent No.: US 12,119,644 B2
(45) Date of Patent: Oct. 15, 2024

(54) CONTROL METHOD FOR PHOTOVOLTAIC RAPID SWITCHING-OFF SYSTEM, AND APPLICATION APPARATUS AND SYSTEM THEREFOR

(71) Applicant: Sungrow Power Supply Co., Ltd., Hefei (CN)

(72) Inventors: Yu Yang, Hefei (CN); Yanfei Yu, Hefei (CN); Jun Xu, Hefei (CN); Qiaodi Chen, Hefei (CN)

(73) Assignee: Sungrow Power Supply Co., Ltd., Hefei (CN)

( * ) Notice: Subject to any disclaimer, the term of this patent is extended or adjusted under 35 U.S.C. 154(b) by 187 days.

(21) Appl. No.: 17/914,702

(22) PCT Filed: Mar. 8, 2021

(86) PCT No.: PCT/CN2021/079463
§ 371 (c)(1),
(2) Date: Sep. 26, 2022

(87) PCT Pub. No.: WO2021/253876
PCT Pub. Date: Dec. 23, 2021

(65) Prior Publication Data
US 2023/0291201 A1    Sep. 14, 2023

(30) Foreign Application Priority Data

Jun. 15, 2020   (CN) .......................... 202010542614.8

(51) Int. Cl.
*H02J 3/00*   (2006.01)
*H02J 3/38*   (2006.01)

(52) U.S. Cl.
CPC ................ *H02J 3/001* (2020.01); *H02J 3/38* (2013.01); *H02J 2300/26* (2020.01)

(58) Field of Classification Search
CPC .... H02J 3/001; H02J 3/38; H02J 3/381; H02J 2300/24; H02J 2300/26; Y02E 10/56
(Continued)

(56) References Cited

U.S. PATENT DOCUMENTS 9,654,028 B1 *   5/2017   Luo ...................... H02M 7/537
9,960,732 B2      5/2018   Hoft

FOREIGN PATENT DOCUMENTS

CN    108418543 A    8/2018
CN    108512245 A    9/2018
(Continued)

OTHER PUBLICATIONS

Machine translation of Huang et al. Chinese Patent Document CN 109038669 A Dec. 2018 (Year: 2018).*
(Continued)

*Primary Examiner* — Kevin J Comber
(74) *Attorney, Agent, or Firm* — Wolf, Greenfield & Sacks, P.C.

(57) ABSTRACT

A method for controlling a photovoltaic rapid shutdown system, an inverting system, and a photovoltaic rapid shutdown system. In the photovoltaic rapid shutdown system, the inverting system determines whether the photovoltaic rapid shutdown system is to enter a safe mode, introduces fluctuations onto a direct-current bus in the photovoltaic rapid shutdown system in response to the photovoltaic rapid shutdown system being not to enter the safe mode, and otherwise does not introduce the fluctuations onto the direct-current bus. A shutdown device for a photovoltaic module determines according to an output parameter thereof whether an electrical parameter on the direct-current bus connected to the shutdown device meets a preset condition, controls itself to be turned on or maintains itself being on in response to the electrical parameter meeting the preset
(Continued)

condition, and otherwise controls itself to be turned off or maintains itself being off.

19 Claims, 13 Drawing Sheets

(58) Field of Classification Search
USPC .......................................................... 361/78
See application file for complete search history.

(56) References Cited

FOREIGN PATENT DOCUMENTS

| CN | 109038669 | A | * | 12/2018 | ............... H02H 7/22 |
|----|-----------|---|---|---------|---------------------------|
| CN | 109245713 | A |   | 1/2019  |                           |
| CN | 109787290 | A | * | 5/2019  |                           |
| CN | 109802441 | A | * | 5/2019  |                           |
| CN | 209217733 | U |   | 8/2019  |                           |
| CN | 110854919 | A |   | 2/2020  |                           |
| CN | 111585308 | A |   | 8/2020  |                           |

OTHER PUBLICATIONS

Machine translation of Shen et al. Chinese Patent Document CN 109787290 A May 2019 (Year: 2019).*
Machine translation of Wang et al. Chinese Patent Document CN 109802441 A May 2019 (Year: 2019).*
International Search Report and Written Opinion for International Application No. PCT/CN2021/079463, mailed Jun. 16, 2021.
Extended European Search Report for European Application No. 21826158.4, dated Jul. 16, 2024.

* cited by examiner

CONTROL METHOD FOR PHOTOVOLTAIC RAPID SWITCHING-OFF SYSTEM, AND APPLICATION APPARATUS AND SYSTEM THEREFOR

This application is the national stage under 35 U.S.C. § 371 of International Application Serial No. PCT/CN PCT/CN2021/079463, filed on Mar. 8, 2021, which claims priority to Chinese Patent Application No. 202010542614.8 entitled "METHOD FOR CONTROLLING PHOTOVOLTAIC RAPID SHUTDOWN SYSTEM, AND APPARATUS AND SYSTEM APPLYING THE SAME", filed on Jun. 15, 2020 with the China National Intellectual Property Administration. The contents of these applications are incorporated herein by reference in their entireties

FIELD

The present disclosure relates to the technical field of photovoltaic grid-connected power generation, and in particular to a method for controlling a photovoltaic rapid shutdown system, an apparatus applying the method, and a system applying the method.

BACKGROUND

Photovoltaic power is renewable energy, and hence photovoltaic power generation technology is widely applied. A direct current is outputted from a photovoltaic array and then converted into an alternating current power by an inverter, and the alternating current power is transmitted to a power grid. A high voltage is outputted by serial-connected photovoltaic arrays. Hence, in order to ensure its safety, a photovoltaic system should be capable of being rapidly shut down when there is a safety fault, and recover outputting power after the fault is eliminated. That is, after the fault is eliminated, all shutdown devices for photovoltaic modules in the photovoltaic system should be turned on again, such that the photovoltaic module connected thereto can output power.

In conventional technology, it is necessary to provide a central controller which transmit a continuous heartbeat communication signal, or provide a shutdown control module which is connected on a direct-current bus and transmit periodic excitation pulses, in order to activate the shutdown device. In the above two solutions, required are not only a transmission module in the photovoltaic inverting system, but also an additional receiving module in the shutdown device. Hence, a cost is increased for rapid shutdown of the photovoltaic system.

SUMMARY

In view of the above, a method for controlling a photovoltaic rapid shutdown system, and an apparatus and a system applying the same are provided according to embodiments of the present disclosure. Thereby, a receiving module is saved in a shutdown device when implementing startup and rapid shutdown of a photovoltaic system, reducing a hardware cost of a photovoltaic rapid shutdown system.

In a first aspect, a method for controlling a photovoltaic rapid shutdown system is provided. The method includes: determining, by an inverting system in the photovoltaic rapid shutdown system, whether the photovoltaic rapid shutdown system is to enter a safe mode; introducing, by the inverting system, one or both of voltage fluctuations and current fluctuations onto a direct-current bus in the photovoltaic rapid shutdown system, in a case that the photovoltaic rapid shutdown system is not to enter the safe mode; not introducing, by the inverting system, the one or both of the voltage fluctuations and the current fluctuations onto the direct-current bus in the photovoltaic rapid shutdown system, in a case that the photovoltaic rapid shutdown system is to enter the safe mode; determining, by a shutdown device for a photovoltaic module in the photovoltaic rapid shutdown system according to an output parameter of the shutdown device, whether one or both of a voltage and a current on the direct-current bus connected to the shutdown device meets a preset condition; controlling, by the shutdown device, the shutdown device to be turned on, or maintaining the shutdown device being on, in a case that the one or both of the voltage and the current on the direct-current bus connected to the shutdown device meets the preset condition; and controlling, by the shutdown device, the shutdown device to be turned off, or maintaining the shutdown device being off, in a case that the one or both of the voltage and the current on the direct-current bus connected to the shutdown device does not meet the preset condition.

In an embodiment, an interval between adjacent groups of the one or two of the voltage fluctuations and the current fluctuations, which are introduced by the inverting system onto the direct-current bus, is less than rapid shutdown duration of the photovoltaic rapid shutdown system; and/or duration of the inverting system not introducing the one or both of the voltage fluctuations and the current fluctuations onto the direct-current bus is greater than or equal to the rapid shutdown duration.

In an embodiment, the safe mode is each shutdown device limiting power outputted by a corresponding photovoltaic module such that the voltage on the direct-current bus is less than a preset voltage for a first preset period.

In an embodiment, before introducing, by the inverting system, the one or both of the voltage fluctuations and the current fluctuations onto the direct-current bus in the photovoltaic rapid shutdown system, the method further includes: determining, by the inverting system, whether there is a fault in the photovoltaic rapid shutdown system; performing the step of introducing, by the inverting system, the one or both of the voltage fluctuations and the current fluctuations onto the direct-current bus, in a case that there is no fault in the photovoltaic rapid shutdown system; and performing the step of not introducing, by the inverting system, the one or both of the voltage fluctuations and the current fluctuations onto the direct-current bus, in a case that there is the fault in the photovoltaic rapid shutdown system.

In an embodiment, the fault includes at least one of: a fault of a grid voltage, a fault of a grid frequency, a fault of grounding impedance, a fault of a direct-current arc flash, manual activation of a rapid shutdown control switch, or a fault of manual shutdown.

In an embodiment, the preset condition includes that a fluctuation greater than a corresponding threshold occurs within a second preset period, where the second preset period is less than rapid shutdown duration of the photovoltaic rapid shutdown system.

In an embodiment, the one or both of the voltage fluctuations and the current fluctuations introduced by the inverting system onto the direct-current bus has a frequency greater than a preset frequency, and determining, by the shutdown device according to the output parameter, whether the one or both of the voltage and the current on the direct-current bus connected to the shutdown device meets the preset condition includes: extracting, by the shutdown device from the output parameter, an effective value of an alternating-current ripple within the second preset period; determining, by the shutdown device, whether the effective value is greater than or equal to a preset alternating-current ripple value; determining that the one or both of the voltage and the current on the direct-current bus connected to the shutdown device meets the preset condition, in a case that the effective value is greater than or equal to the preset alternating-current ripple value; and determining that the one or both of the voltage and the current on the direct-current bus connected to the shutdown device does not meet the preset condition, in a case that the effective value is less than the preset alternating-current ripple value.

In an embodiment, the one or both of the voltage fluctuations and the current fluctuations introduced by the inverting system onto the direct-current bus has a frequency smaller than a preset frequency, and determining, by the shutdown device according to the output parameter, whether the one or both of the voltage and the current on the direct-current bus connected to the shutdown device meets the preset condition includes: determining, by the shutdown device, whether a difference between an average of the output parameter within a period previous to a moment, at which a fluctuation of the output parameter is detected, and an average of the output parameter within a period subsequent to the moment is greater than a corresponding preset current, where the moment is within the second preset period, and the output parameter is stable in the period previous to the moment and the period subsequent to the moment; determining that the one or both of the voltage and the current on the direct-current bus connected to the shutdown device meets the preset condition, in a case that the difference is greater than the preset current; and determining that the one or both of the voltage and the current on the direct-current bus connected to the shutdown device does not meet the preset condition, in a case that the difference is less than or equal to the preset current.

In an embodiment, the inverting system introduces the voltage fluctuations onto the direct-current bus, the output parameter includes an output voltage, and determining, by the shutdown device according to the output parameter, whether the one or both of the voltage and the current on the direct-current bus connected to the shutdown device meets the preset condition includes: determining, by the shutdown device, whether a difference between the voltage previous to a moment, at which the fluctuation of the voltage is detected, and the voltage subsequent to the moment is greater than a preset voltage, where the moment is within the second preset period; determining that the voltage on the direct-current bus connected to the shutdown device meets the preset condition, in a case that the difference is greater than the preset voltage; and determining that the voltage on the direct-current bus connected to the shutdown device does not meet the preset condition, in a case that the difference is less than or equal to the preset voltage.

In a second aspect, an inverting system is provided. The inverting system includes direct-current voltage-control circuitry and an inverter, where: an output terminal of the direct-current voltage-control circuitry is connected to one or both of a positive line and a negative line of a direct-current bus; a direct-current side of the inverter is connected to the positive line and the negative line of the direct-current bus in a photovoltaic rapid shutdown system; and the inverter in coordination the direct-current voltage-control circuitry is configured to enable the inverting system to determine whether the photovoltaic rapid shutdown system is to enter a safe mode, introduce one or both of voltage fluctuations and current fluctuations onto the direct-current bus in a case that the photovoltaic rapid shutdown system is not to enter the safe mode, and not introduce the one or both of the voltage fluctuations and the current fluctuations onto the direct-current bus in a case that the photovoltaic rapid shutdown system is to enter the safe mode.

In an embodiment, the inverter is configured to: vary an alternating-current output power of the inverter with a high rate within at least one cycle of a power grid to introduce current fluctuations having a frequency greater than a preset frequency onto the direct-current bus; or vary a direct-current input current of the inverter with a low rate to introduce current fluctuations having a frequency less than the preset frequency onto the direct-current bus.

In an embodiment, the direct-current voltage-control circuitry is a starting voltage module, of which an input terminal is connected to an energy storage system or a power grid, and the starting voltage module is configured to apply multiple levels of direct-current voltages separately on the direct-current bus under control of the inverter and stop applying the multiple levels of direct-current voltages on the direct-current bus under the control of the inverter.

In an embodiment, the input terminal of the starting voltage module is connected to the power grid, and the starting voltage module includes a transformer, a diode rectifier bridge, and a starting DC/DC circuit, where: a primary winding of the transformer is connected to the power grid; a secondary winding of the transformer is connected to input terminals of the diode rectifier bridge; a positive output terminal and a negative output terminal of the diode rectifier bridge are connected to a side of the starting DC/DC circuit; and another side of the starting DC/DC circuit serves as output terminals of the starting voltage module.

In an embodiment, the transformer is a power-frequency isolation transformer or a high-frequency isolation transformer, and the starting DC/DC circuit is a buck circuit, a boost circuit, or a buck-boost circuit.

In an embodiment, the direct-current voltage-control circuitry is a direct-current voltage controller independently connected in the direct-current bus, and the direct-current voltage controller communicates with the inverter via a power line carrier, wireless communication, or wired communication.

In an embodiment, the direct-current voltage controller is further configured perform maximum power point tracking of the direct-current bus.

In a third aspect, a photovoltaic rapid shutdown system is further provided. The photovoltaic rapid shutdown system includes at least one shutdown system and at least one inverting system according to the second aspect, where: each shutdown system includes a direct-current bus, at least N photovoltaic modules, and N shutdown devices for the at least N photovoltaic modules, N being a positive integer; and in each shutdown system, the N shutdown devices are cascaded via output terminals of the N shutdown devices and are correspondingly connected to output terminals of the at least N photovoltaic modules via input terminals of the N shutdown devices, a positive terminal of the cascaded shutdown devices is connected to a positive terminal of a direct-current interface of a corresponding inverting system of the N inverting systems via a positive line of the direct-current bus, and a negative terminal of the cascaded shutdown devices is connected to a negative terminal of the direct-current interface via a negative line of the direct-current bus.

In an embodiment, each shutdown device includes a switching unit, a driving circuit, a processor, a parameter collecting unit, a bypass diode, and an output stabilizing capacitor, where: the switching unit is connected in a positive branch or a negative branch of the shutdown device, and is configured to turn on and turn off said shutdown device under control of the processor; the parameter collecting unit is configured to collect an output parameter of said shutdown device and report the collected output parameter to the processor; the bypass diode is configured to implement a bypass of said shutdown device when said shutdown device is turned off; the output stabilizing capacitor is configured to stabilize an output voltage of said shutdown device; an output terminal of the processor is connected to a control terminal of the switching unit via the driving circuit; the processor, in coordination with the parameter collecting unit, the driving circuit, the output stabilizing capacitor and the switching unit is configured to enable said shutdown device to determine according to the output parameter of said shutdown device whether one or both of a voltage and a current on the direct-current bus connected to said shutdown device meets a preset condition, control said shutdown device to be turned on or maintain said shutdown device being on in a case that the one or both of the voltage and the current on the direct-current bus connected to said shutdown device meets the preset condition, and control said shutdown device to be turned off or maintain the shutdown device being off in a case that the one or both of the voltage and the current on the direct-current bus connected to said shutdown device does not meet the preset condition.

In an embodiment, the parameter collecting unit includes an output voltage collecting unit and an output current collecting unit, where the output current collecting unit is configured to collect an output current of said shutdown device, and the output voltage collecting unit is configured to collect an output voltage of said shutdown device.

In an embodiment, the parameter collecting unit further includes an input voltage collecting unit configured to collect an input voltage of said shutdown device.

In an embodiment, the current collecting unit is connected in a negative branch of said shutdown device and between an anode of the bypass diode and a negative output terminal of said shutdown device; the current collecting unit is connected in the negative branch of said shutdown device and between the anode of the bypass diode and a negative input terminal of the output voltage collecting unit; the current collecting unit is connected in a positive branch of said shutdown device and between a cathode of the bypass diode and a positive output terminal of said shutdown device; or, the current collecting unit is connected in the positive branch of said shutdown device and between the cathode of the bypass diode and a positive input terminal of the output voltage collecting unit.

In an embodiment, the switching unit includes at least one switching module, where: in a case that a quantity of the at least one switching module is 1, an input terminal of the switching module serves as an input terminal of the switching unit, an output terminal of the switching module serves as an output terminal of the switching unit, and a control terminal of the switching module serves as a control terminal of the switching unit; and in a case that a quantity of the at least on switching module is not 1, an input terminal of a branch formed by all switching modules which are connected in series serves as the input terminal of the switching unit, an output terminal of the branch serves as the output terminal of the switching unit, and control terminals of all switching modules serve as control terminals of the switching unit.

The method for controlling the photovoltaic rapid shutdown system is provided according to embodiments of the present disclosure. The inverting system in the photovoltaic rapid shutdown system determines whether the photovoltaic rapid shutdown system is to enter the safe mode. The inverting system introduces the voltage fluctuations and/or the current fluctuations onto the direct-current bus in the photovoltaic rapid shutdown system in the case that the photovoltaic rapid shutdown system is not to enter the safe mode, and otherwise does not introduce the voltage fluctuations and/or the current fluctuations onto the direct-current bus. The shutdown device for the photovoltaic module in the photovoltaic rapid shutdown system determines according to the output parameter thereof whether the voltage and/or the current on the direct-current bus connected thereto meets the preset condition. The shutdown device controls itself to be turned on or maintains itself being on in the case that the voltage and/or the current on the direct-current bus connected thereto meets the preset condition, and otherwise controls itself to be turned off or maintains itself being off. Therefore, the shutdown device is always turned on or off based on the voltage fluctuations and/or the current fluctuations on the direct-current bus. That is, the shutdown device is capable to implement the on/off communication with the inverting system only via an inherent sampling device in the shutdown device. It is not necessary to provide an additional receiving device in the shutdown device and a transmitting device in the inverting system, which reduces a hardware cost of the photovoltaic rapid shutdown system.

DETAILED DESCRIPTION

Hereinafter technical solutions in embodiments of the present disclosure are described clearly and completely in conjunction with the drawings in embodiments of the present closure. Apparently, the described embodiments are only some rather than all of the embodiments of the present disclosure. Any other embodiments obtained based on the embodiments of the present disclosure by those skilled in the art without any creative effort fall within the scope of protection of the present disclosure.

The terms such as "include", "comprise" or any other variants thereof means to be non-exclusive. Therefore, a process, a method, an article or a device including a series of elements include not only the disclosed elements but also other elements that are not clearly enumerated, or further include inherent elements of the process, the method, the article or the device. Unless expressively limited, the statement "including a . . . " does not exclude the case that other similar elements may exist in the process, the method, the article or the device other than enumerated elements.

A method for controlling a photovoltaic rapid shutdown system is provided according to an embodiment of the present disclosure. Addressed is an issue that an additional receiving module should be provided in a shutdown device for a photovoltaic module, which increases a hardware cost of the shutdown device in conventional technology.

Figure 10:
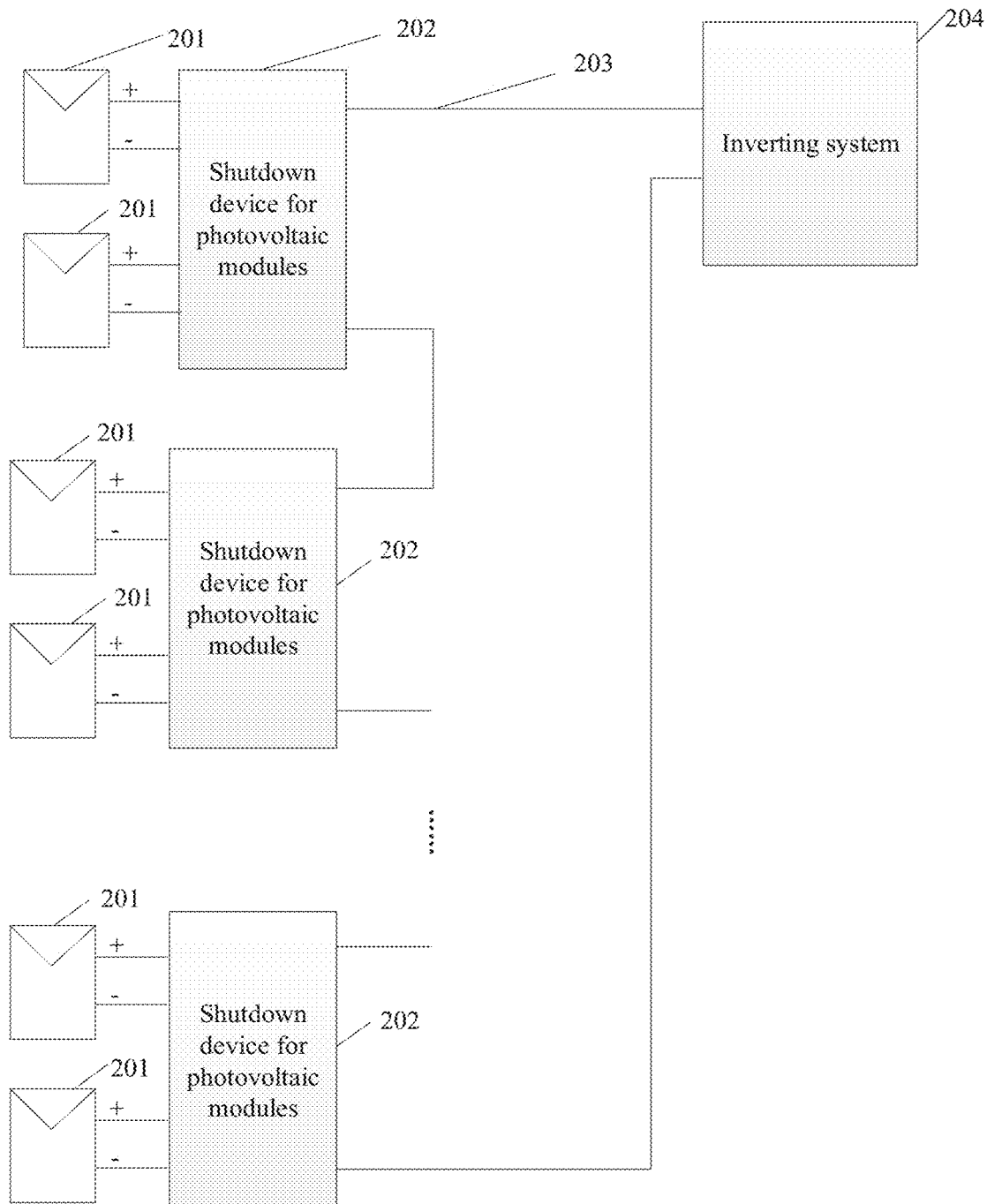
FIG. 10 is a schematic diagram of a photovoltaic rapid shutdown system according to an embodiment of the present disclosure.

As shown in FIG. 10, the photovoltaic rapid shutdown system includes at least one shutdown system and at least one inverting system 204. The shutdown system includes a direct-current bus 203, at least N photovoltaic modules 201, and N shutdown devices 202 for the photovoltaic modules. N is a positive integer.

In the shutdown system, the N shutdown devices 202 are cascaded via output terminals thereof, and are correspondingly connected to output terminals of the photovoltaic modules 201 via input terminals of the N shutdown devices 202. A positive terminal of the cascaded shutdown devices 202 is connected to a positive terminal of a direct-current interface of the inverting system 204 via a positive line of the direct-current bus 203. A negative terminal of the cascaded shutdown devices 202 is connected to a negative terminal of the direct-current interface of the inverting system 204 via a negative line of the direct-current bus 203.

Figure 1:
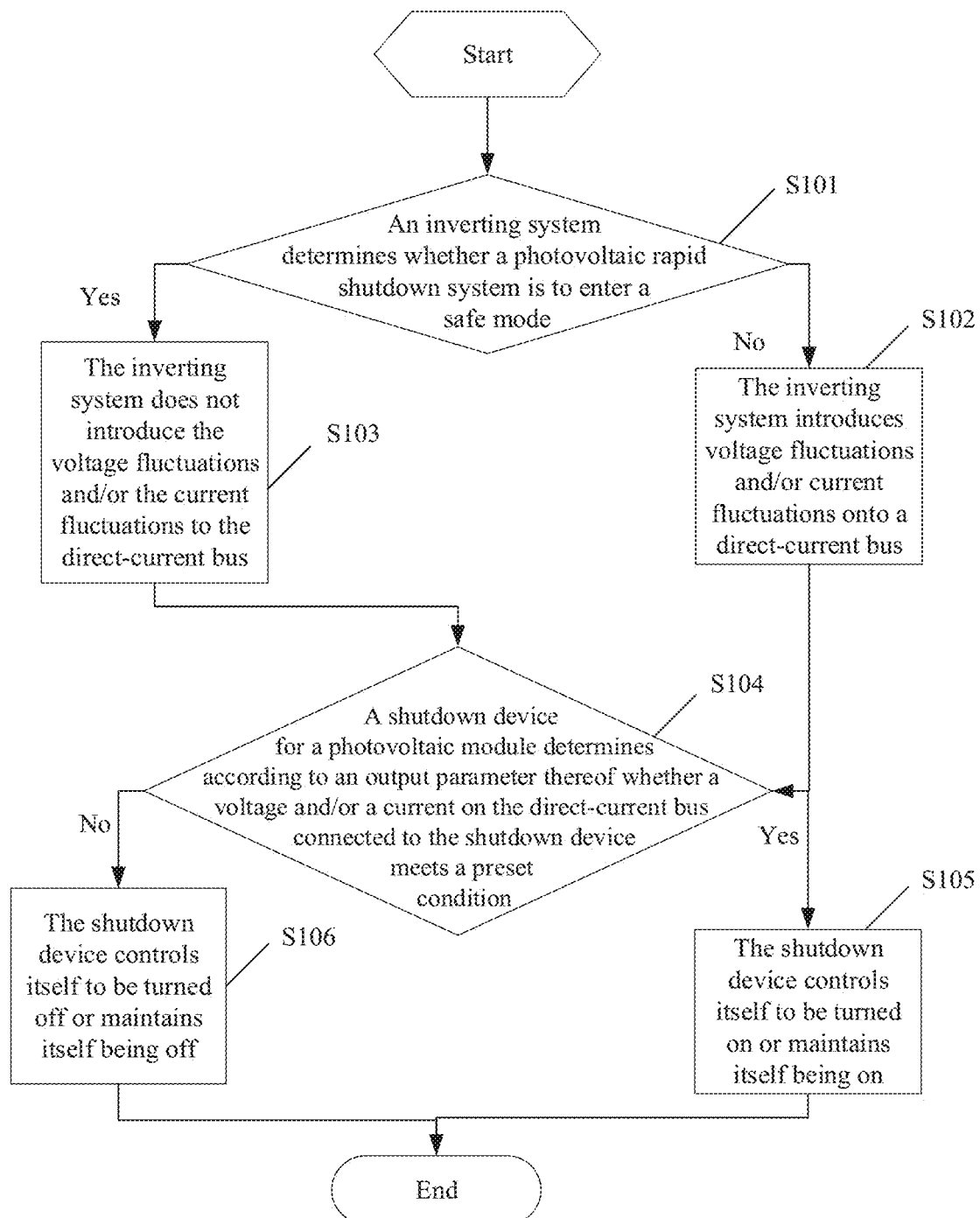
FIG. 1 is a schematic diagram of a method for controlling a photovoltaic rapid shutdown system according to an embodiment of the present disclosure.

Reference is made to FIG. 1, which is a method for controlling a photovoltaic rapid shutdown system. The method includes following steps S101 to S106.

In step S101, an inverting system determines whether the photovoltaic rapid shutdown system is to enter a safe mode.

In practice, the safe mode refers to that each shutdown device limits power outputted by a corresponding photovoltaic module, such that a voltage on the direct-current bus is less than a preset voltage within a first preset period. That is, the voltage on the direct-current bus is maintained low. The first preset period is not limited herein and may depend on an actual situation, and all implementations fall within the protection scope of the present disclosure. Moreover, whether the photovoltaic rapid shutdown system is to enter the safe mode may be determined according to an instruction issued by an upper computer, or according to a result of detecting the voltage. The means may be same as that in conventional technology art and is not limited herein.

The process goes to step S102 in a case that the photovoltaic rapid shutdown system is not to enter the safe mode, and goes to step S103 in a case that the photovoltaic rapid shutdown system is to enter the safe mode.

In step S102, the inverting system introduces voltage fluctuations and/or current fluctuations onto the direct-current bus.

The voltage fluctuations and/or the current fluctuations are introduced onto the direct-current bus to break the stable direct-current state of a voltage and/or a current on the direct-current bus. The voltage fluctuations and/or the current fluctuations on the direct-current bus are transmitted to output terminals of the shutdown device for the photovoltaic module, so that the shutdown device is capable to determine whether it is permitted to be turned on.

In a case that the voltage fluctuations are required to be introduced onto the direct-current bus, the inverting system controls a starting power module thereof to apply multiple levels of voltages separately on the direct-current bus, such that all shutdown devices connected to the direct-current bus are activated. Amplitude and duration of each level of the voltage are predetermined by the shutdown device and the inverting system, which are not limited herein. All implementations fall within the protection scope of the present disclosure.

Figure 5:
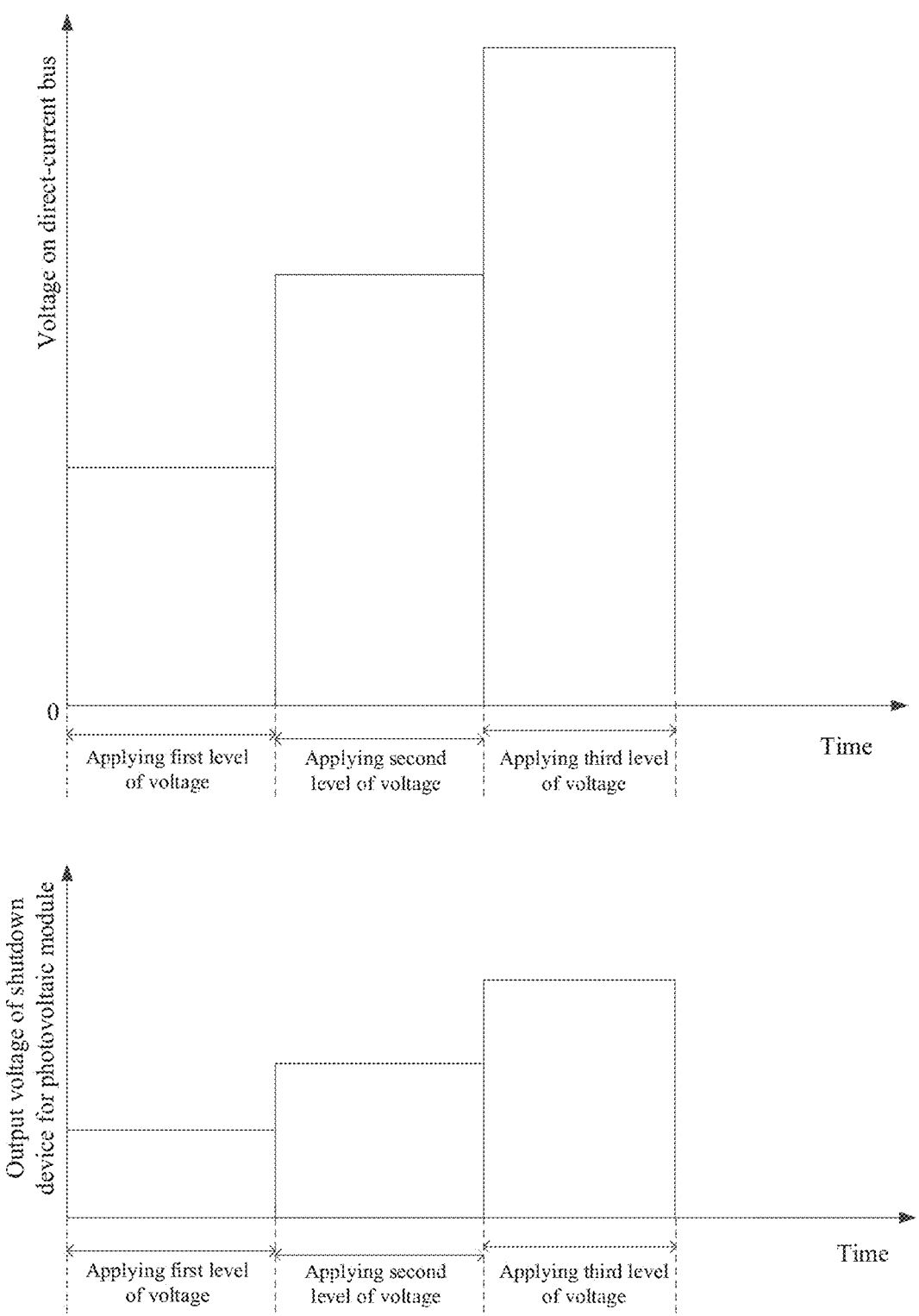
FIG. 5 is schematic graphs of a voltage on a direct-current bus and an output voltage of a shutdown device according to an embodiment of the present disclosure.

Reference is made to FIG. 5, which shows a correspondence between the voltage on the direct-current bus and the output voltage of the shutdown device when the starting power module applies the multiple levels separately on the direct-current bus. The practical applications are limited thereto.

The shutdown device may perform erroneous shutdown when an interval between adjacent groups of fluctuations is long. In order to avoid such problem, in practice, the interval between adjacent groups of the voltage fluctuations and/or the current fluctuations, which are introduced by the inverting system onto the direct-current bus, is less than rapid shutdown duration of the photovoltaic rapid shutdown system, which is specified in a relevant standard. For example, the rapid shutdown duration is 30 seconds as specified in the standard NEC217. Therefore, the shutdown device can be maintained on without erroneous shutdown, as long as the inverting system continues introducing the voltage fluctuations and/or the current fluctuations onto the direct-current bus and the interval between adjacent groups of the fluctuations is less than the rapid shutdown duration. The rapid shutdown duration is not limited herein and may depend on an actual situation, and all implementations fall within the protection scope of the present disclosure.

In step S103, the inverting system does not introduce the voltage fluctuations and/or the current fluctuations onto the direct-current bus.

In a case that the voltage fluctuations and/or the current fluctuations are not introduced onto the direct-current bus, a voltage and/or a current on the direct-current bus is in the constant direct-current state, and the voltage and/or the current transmitted from the direct-current bus to the output terminals of the shutdown device is also in the constant direct-current state.

The shutdown device may erroneously turn on itself when duration of no fluctuations being on the direct-current bus is short. In order to avoid such problem, in practice, duration of the inverting system not introducing the voltage fluctuations and/or the current fluctuations onto the direct-current bus is greater than or equal to the rapid shutdown duration of the photovoltaic rapid shutdown system, which is specified in a relevant standard. Therefore, the inverting system does not introduce the voltage fluctuations and/or the current fluctuations onto the direct-current bus for a period longer than or equal to the rapid shutdown duration, and correspondingly the shutdown device does not detect fluctuations for the period longer than or equal to the rapid shutdown duration. Hence, the shutdown device controls itself to be turned off.

In step S104, the shutdown device determines according to an output parameter of itself whether a voltage and/or a current on the direct-current bus connected to the shutdown device meets a preset condition.

The output parameter of the shutdown device changes due to the voltage and/or the current on the direct-current bus connected to the shutdown device being changed. That is, the output parameter of the shutdown device is positively proportional to the voltage and/or the current on the direct-current bus connected to the shutdown device. Therefore, when the inverting system controls the voltage on the direct-current bus to fluctuate, an output voltage of the shutdown device varies accordingly. When the inverting system controls the current on the direct-current bus to fluctuate, an output current of the shutdown device changes accordingly.

In practice, the preset condition includes there being a fluctuation greater than a corresponding threshold within a second preset period, and the second preset period is less than the rapid shutdown duration of the photovoltaic rapid shutdown system. That is, the shutdown device determines that the preset condition is met in a case that the shutdown device detects that there is a voltage fluctuation greater than a voltage threshold and/or a current fluctuation greater than a current threshold on the direct-current bus before the rapid shutdown duration expires, and determines that the preset condition is not met in a case that the shutdown device detects no voltage fluctuation greater than the voltage threshold and/or no current fluctuation greater than the current threshold for a period longer than the rapid shutdown duration. A specific process of the step S104 includes a following step. It is determined according to the output voltage of the shutdown device whether a deliberate voltage fluctuation is introduced onto the direct-current bus connected to the shutdown device, or it is determined according to the output current of the shutdown device whether a deliberate current fluctuation is introduced onto the direct-current bus connected to the shutdown device.

In practice, different means may be adopted in the step S104 to determine whether there is the fluctuation when the fluctuations introduced by the inverting system onto the direct-current bus in the step S102 are of different types.

Figure 3:
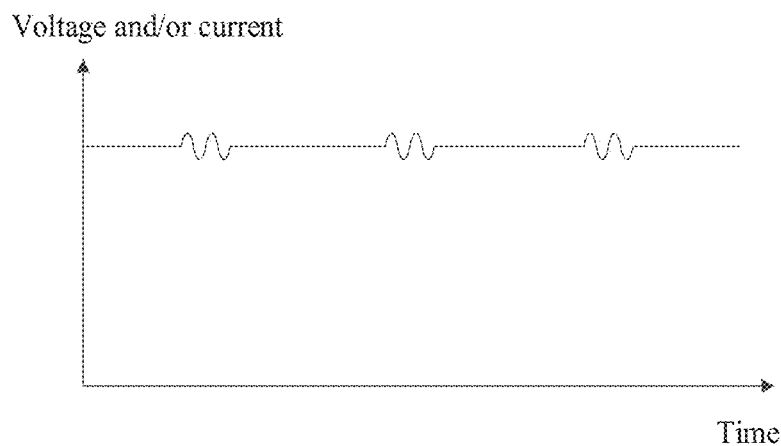
FIG. 3 is a schematic graph of current fluctuations according to an embodiment of the present disclosure.

(1) In the step S102, the inverting system introduces the voltage fluctuations and/or the current fluctuations, which have a frequency higher than a preset frequency, onto the direct-current bus. In practice, the preset frequency may be a first preset frequency which indicates that rapid voltage fluctuations and/or rapid current fluctuations, for example, the voltage fluctuations and/or the current fluctuations as shown in FIG. 3, are currently introduced. In such case, the output parameter of the shutdown device includes the output voltage and/or the output current of the shutdown device, and the step S104 includes a following step. The shutdown device extracts an effective value of an alternating-current ripple from the output parameter within the second preset period, and determines whether the effective value is greater than or equal to a preset alternating-current ripple value. The shutdown device determines that the voltage and/or the current on the direct-current bus connected to the shutdown device meets the preset condition, in a case that the effective value is greater than or equal to the preset alternating-current ripple value. Otherwise, the shutdown device determines that the voltage and/or the current on the direct-current bus connected to the shutdown device does not meet the preset condition.

Figure 4:
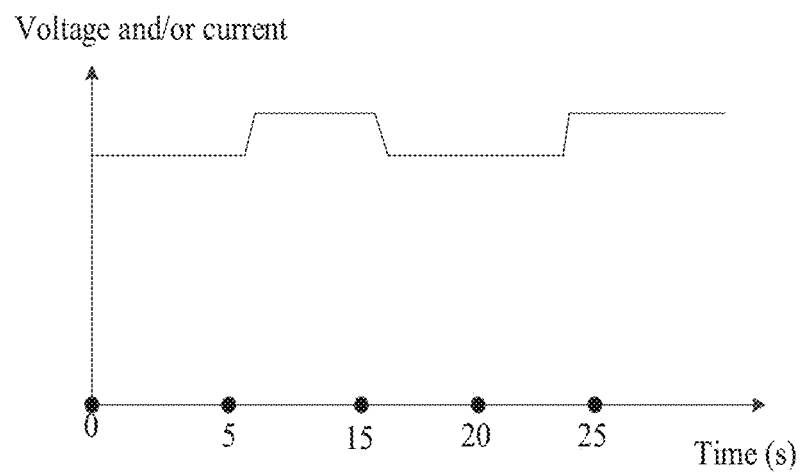
FIG. 4 is a schematic graph of current fluctuations according to another embodiment of the present disclosure.

(2) In the step S102, the inverting system introduces the voltage fluctuations and/or the current fluctuations, which have a frequency lower than a preset frequency, onto the direct-current bus. In practice, the preset frequency herein may be a second preset frequency which is less than or equal to the first preset frequency, and which indicates that slow voltage fluctuations and/or slow current fluctuations, for example, the voltage fluctuations and/or the current fluctuations as shown in FIG. 4, are currently introduced. In such case, the output parameter of the shutdown device includes the output voltage and/or the output current of the shutdown device, and the step S104 includes following steps. The shutdown device determines whether a difference an average of the output parameter within a period previous to a moment, which is in the second preset period and at which a fluctuation of the output parameter is detected, and an average of the output parameter within a period subsequent to the moment is greater than a corresponding preset current, where the output parameter is stable in the period previous to the moment and the period subsequent to the moment. The shutdown device determines that the voltage and/or the current on the direct-current bus connected to the shutdown device meets the preset condition, in a case that the difference is greater than the preset current. Otherwise, the shutdown device determines that the voltage and/or the current on the direct-current bus connected to the shutdown device does not meet the preset condition.

It is taken as an example that the output parameter is the output current. As shown in FIG. 4, the output current fluctuates at the moment of 5 s, and it is determined whether a difference between an average current within a period from 0 s to 5 s and an average current for a period from 5 s to 15 s is greater than the preset current. It is determined that the current on the direct-current bus connected to the shutdown device meets the preset condition, in a case that the difference is greater than the preset current. Otherwise, it is determined that the current on the direct-current bus connected to the shutdown device does not meet the preset condition.

(3) In the step S102, the inverting system introduces the voltage fluctuations onto the direct-current bus. In such case, the output parameter of the shutdown device includes the output voltage, and the step S104 includes following steps. The shutdown device determines whether a difference between the voltage previous to a moment, which is in the second preset period and at which the fluctuation of the voltage is detected, and the voltage subsequent to the moment is greater than a preset voltage. The shutdown device determines that the voltage on the direct-current bus connected to the shutdown device meets the preset condition, in a case that the difference is greater than the preset voltage. Otherwise, the shutdown device determines that the voltage on the direct-current bus connected to the shutdown device does not meet the preset condition.

The inverting system may vary an alternating-current output power of itself abruptly during one or more cycles of the power grid, so as to introduce the rapid voltage fluctuations and/or the rapid current fluctuation onto the direct-current bus. Alternatively, the inverting system may vary a direct-current input current of itself to introduce the slow voltage fluctuations and/or the slow current fluctuations onto the direct-current bus. Alternatively, the inverting system may apply multiple levels of voltages separately on the direct-current bus via a starting voltage module therein. Alternatively, in a case that an inverter in the inverting system is difficult to modify due to hardware or software limitations and hence cannot introduce the voltage fluctuations and/or the current fluctuations, the aforementioned functions may be implemented by a direct-current voltage controller. Details of the direct-current voltage controller may refer to inverting system embodiments in following description.

The processes described in the above cases (1) and (2) are merely examples of the current fluctuations, and other cases of the current fluctuations are not enumerated herein. A specific form of the current fluctuations may depend on the actual situation, and all the implementations fall within the protection scope of the present disclosure. In addition, the inverting system may perform control on the direct-current bus through merely the current fluctuations or the voltage fluctuations, or through both the current fluctuations and the voltage fluctuations. Further details of the control process are not descripted herein, and all the implementations fall within the protection scope of the present disclosure.

The process goes to step S105 in a case that the voltage and/or the current on the direct-current bus connected to the shutdown device meets the preset condition, and goes to step S106 in a case that the voltage and/or the current on the direct-current bus connected to the shutdown device does not meet the preset condition.

In step S105, the shutdown device controls itself to be turned on, or maintains itself being on.

The shutdown device maintains itself being on in a case that the shutdown device is on currently. The shutdown device controls itself to be turned on in a case that the shutdown device is off currently. Thereby, the shutdown device is on after this step.

In step S106, the shutdown device controls itself to be turned off, or maintains itself being off.

The shutdown device controls itself to be turned off in a case that the shutdown device is on currently. The shutdown device maintains itself being off in a case that the shutdown device is off currently. Thereby, the shutdown device is off after this step.

In the foregoing process, the shutdown device is turned on or off based on the voltage fluctuations and/or the current fluctuations. That is, the shutdown device can implement on/off communication with the inverting system merely via a current/voltage sampling device in the shutdown device, and it is not necessary to provide an additional receiving device in the shutdown device. Hence, a hardware cost of the shutdown device is reduced, and thereby a hardware cost of the photovoltaic rapid shutdown system is reduced. Accordingly, only a module for controlling the voltage fluctuations and/or the current fluctuations is required in the inverting system, and it is not necessary to provide a signal transmitting module in the inverting system. Hence, a hardware cost of the photovoltaic rapid shutdown system is reduced. In addition, the voltage/current characteristics utilized herein has a low power level, and hence is more reliable and stable. Avoided is a problem that communications such as power line carrier communication and wireless communication are susceptible to interferences, and hence the stability of photovoltaic rapid shutdown system is improved.

Figure 2:
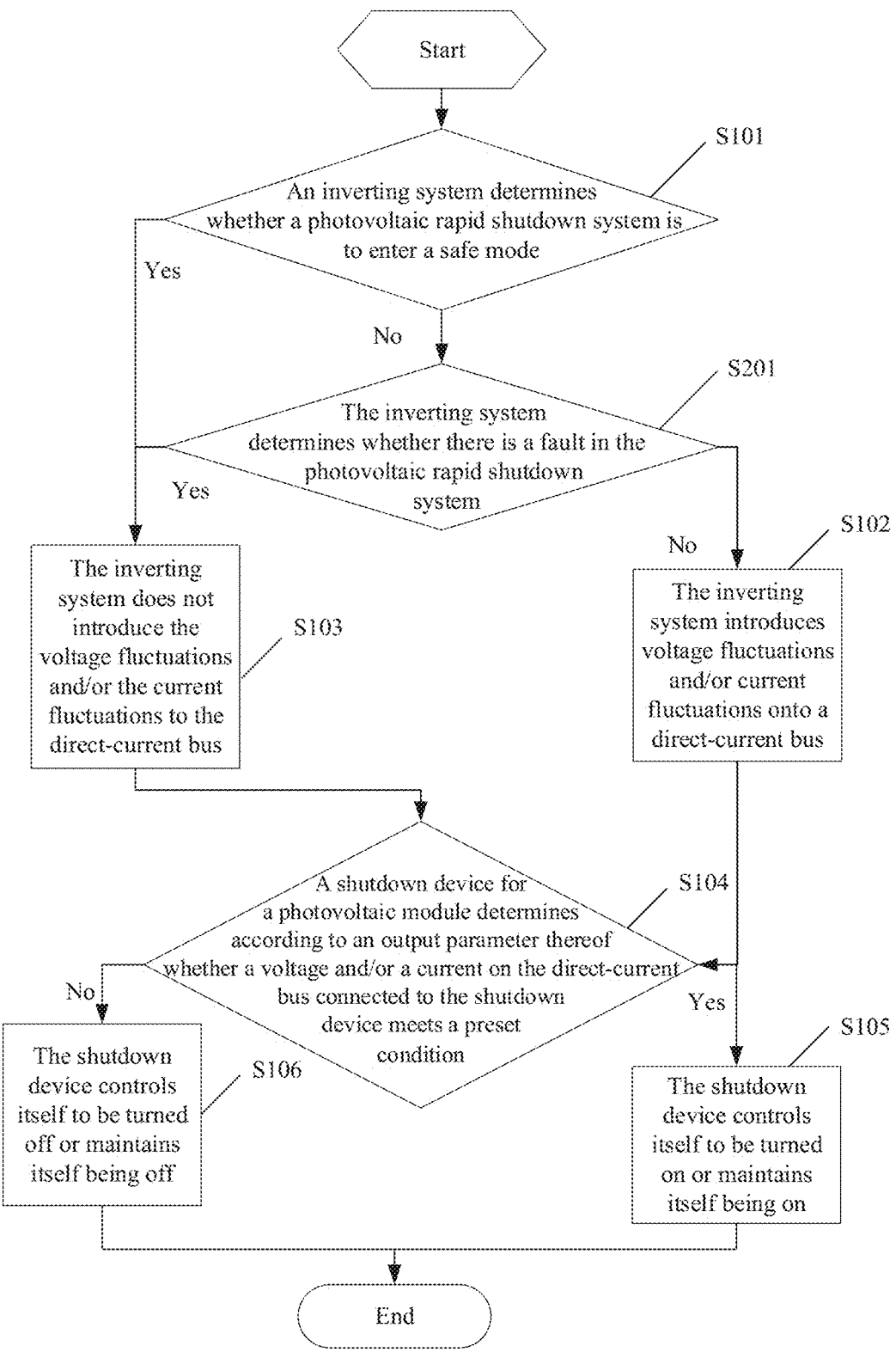
FIG. 2 is a schematic diagram of a method for controlling a photovoltaic rapid shutdown system according to another embodiment of the present disclosure.

In addition, reference is made to FIG. 2, in which the method further includes step S201 before the step S102.

In step S201, the inverting system determines whether there is a fault in the photovoltaic rapid shutdown system.

The fault includes at least one of: a fault of a grid voltage, a fault of a grid frequency, a fault of grounding impedance, a fault of a direct-current arc flash, manual activation of a rapid shutdown control switch, or a fault of manual shutdown.

The process goes to step S102 in a case that there is no fault in the photovoltaic rapid shutdown system, for example, when the fault has disappeared. The process goes to step S103 in a case that there is the fault in the photovoltaic rapid shutdown system.

In this embodiment, the inverting system determines whether there is the fault, before introducing the voltage fluctuations and/or the current fluctuations to control the photovoltaic module device to be turned on. Avoided is a problem that devices in the inverting system are damaged due to the photovoltaic module shutdown device being turned on and the corresponding photovoltaic module outputting power when there is the fault in the photovoltaic rapid shutdown system. Hence, safety of the photovoltaic rapid shutdown system is improved.

Figure 7:
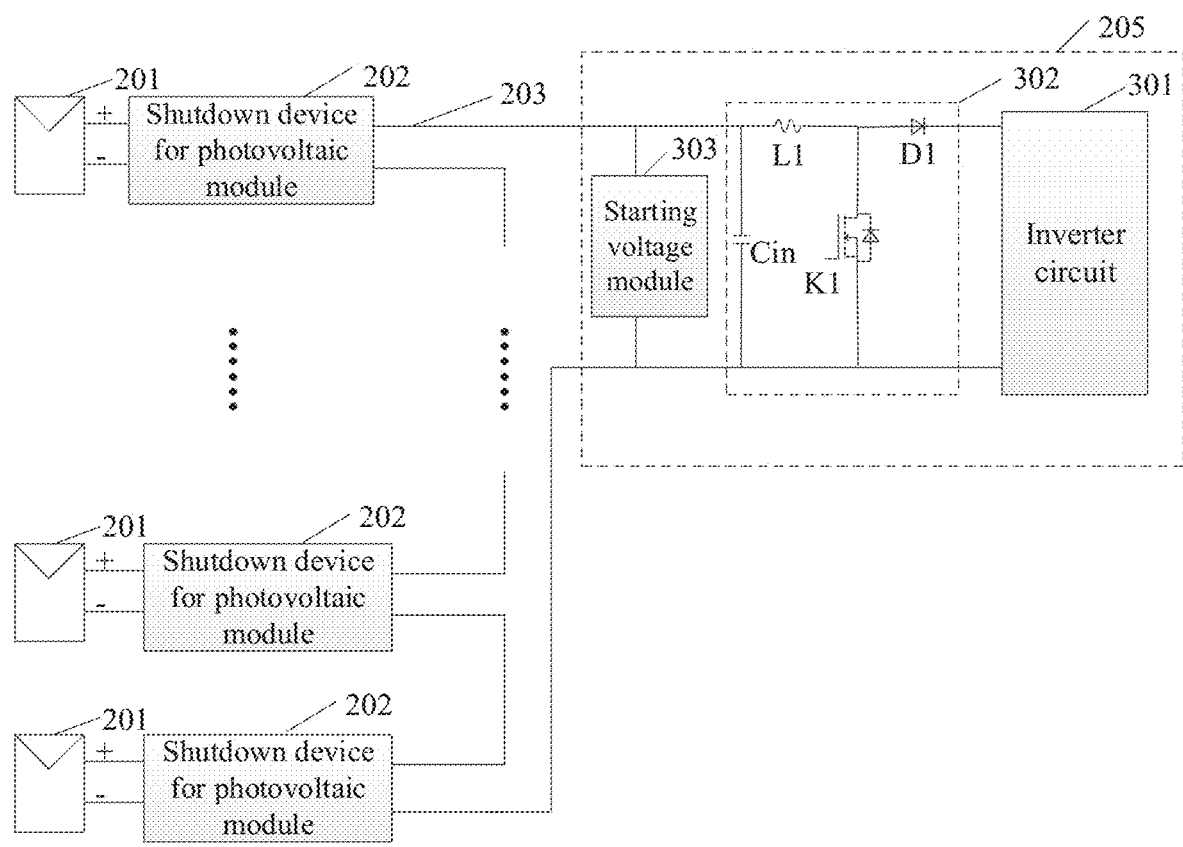
FIG. 7 is a schematic diagram of an inverting system in a photovoltaic rapid shutdown system according to an embodiment of the present disclosure.
Figure 8:
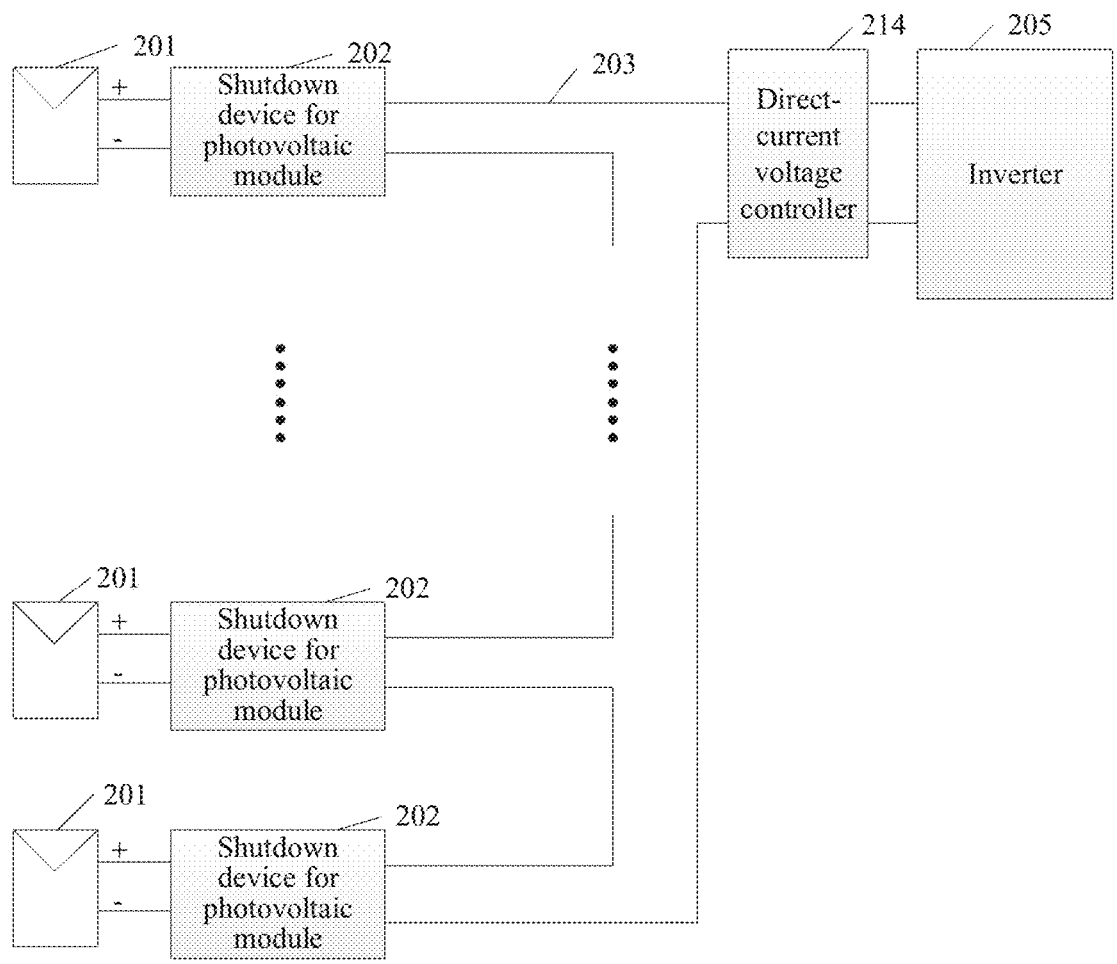
FIG. 8 is a schematic diagram of an inverting system in a photovoltaic rapid shutdown system according to another embodiment of the present disclosure.

An inverting system is provided according to an embodiment of the present disclosure. As shown in FIG. 7, the inverting system includes direct-current voltage-control circuitry (e.g., a starting voltage module 303 as shown in FIGS. 7 and 15, or a direct-current voltage controller 214 as shown in FIGS. 8 and 14) and an inverter 205.

Figure 14:
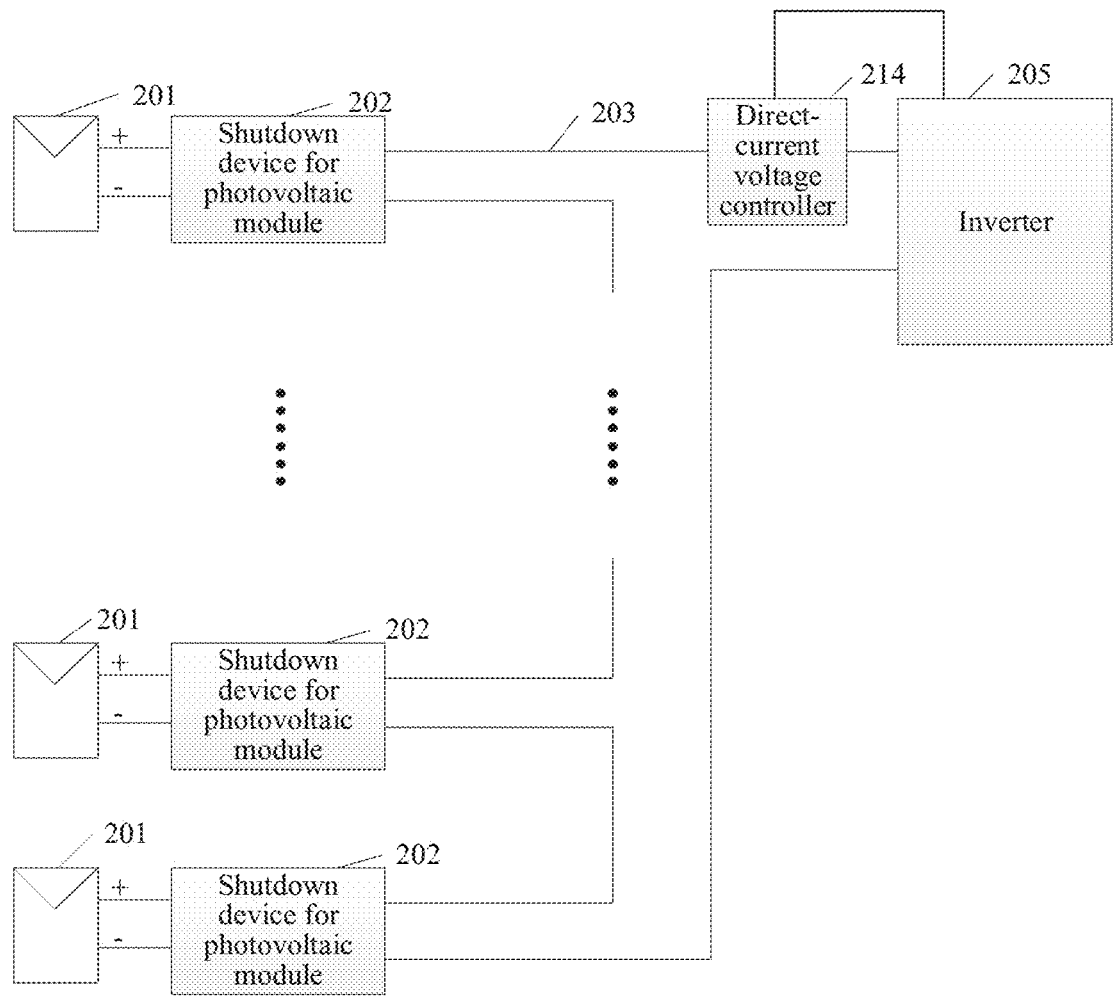
FIG. 14 is a schematic diagram of a photovoltaic rapid shutdown system according to another embodiment of the present disclosure.
Figure 15:
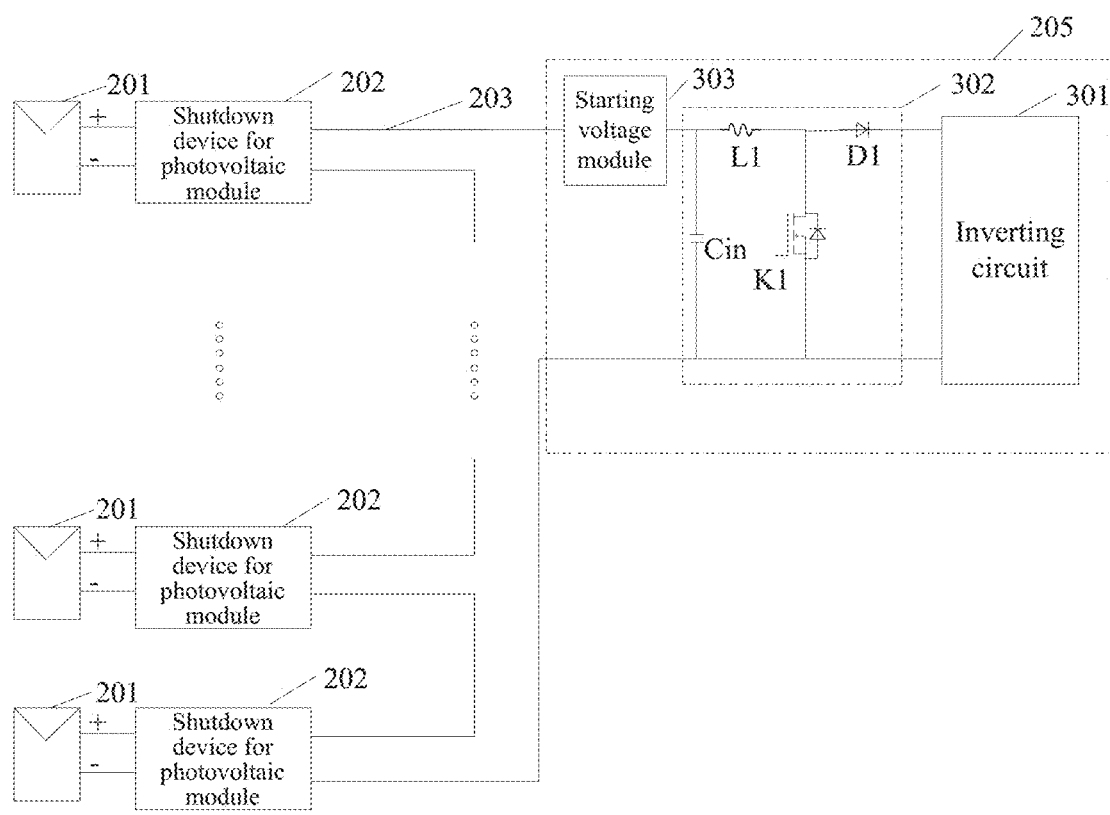
FIG. 15 is a schematic diagram of a photovoltaic rapid shutdown system according to another embodiment of the present disclosure.

An output terminal of the direct-current voltage-control circuitry is connected to a positive line of a direct-current bus (as shown in FIGS. 14 and 15). Alternatively, output terminals of the direct-current voltage-control circuitry are connected to the positive line and a negative line, respectively, of the direct-current bus (as shown in FIGS. 8 and 7). Alternatively, the output terminal of the direct-current voltage-control circuitry is connected to the negative line of the direct-current bus (not depicted in the drawings). A direct-current side of the inverter 205 is connected to the positive line and the negative line of the direct-current bus in the photovoltaic rapid shutdown system.

In a case that the inverter is a grid-connected inverter, the power grid supplies assistant power to the inverter. In a case that the inverter is capable to operate off-grid, the power grid or an energy storage system supplies assistant power to the inverter.

The inverter 205 in coordination with the direct-current voltage-control circuitry enables the inverting system perform the corresponding steps in the method for controlling the photovoltaic rapid shutdown system in the foregoing embodiments. Such steps include determining whether the photovoltaic rapid shutdown system is to enter a safe mode, introducing voltage fluctuations and/or current fluctuations onto the direct-current bus in a case that the photovoltaic rapid shutdown system is not to enter the safe mode, and not introducing the voltage fluctuations and/or the current fluctuations onto the direct-current bus in a case that the photovoltaic rapid shutdown system is to enter the safe mode.

Specific processes and operation principles of the inverting system may refer to the corresponding part in forgoing method embodiments, and are not repeated herein.

The direct-current voltage-control circuitry may be implemented as a direct-current voltage controller 214 independently connected in the direct-current bus (as shown in FIGS. 8 and 14), or as a starting voltage module 303 in the inverter 205 (as shown in FIGS. 7 and 15). Hereinafter the above two implementations are described in details.

(1) As shown in FIGS. 7 and 15, the direct-current voltage-control circuitry is the starting voltage module 303 in the inverter 205. The inverter 205 further includes an internal controller (not depicted), a DC/DC circuit 302, and an inverting circuit 301.

As shown in FIG. 7, a positive terminal and a negative terminal of one side of the DC/DC circuit 302 are connected to a positive input terminal and a negative input terminal, respectively, of the starting voltage module 303, and common terminals in the above two connections serve as a positive terminal and a negative terminal, respectively, of the direct-current side of the inverter 205. The other side of the DC/DC circuit 302 is connected to a direct-current side of the inverting circuit 301. An alternating-current side of the inverting circuit 301 serves as an alternating-current side of the inverter 205.

As shown in FIG. 15, a positive terminal of one side of the DC/DC circuit 302 is connected to a negative output terminal of the starting voltage module 303, a positive output terminal of the starting voltage module 303 serves as a positive terminal of the direct-current side of the inverter 205, and a negative terminal at such side of the DC/DC circuit 302 serves as a negative terminal of the direct-current side of the inverter 205. The other side of the DC/DC circuit 302 is connected to a direct-current side of the inverting circuit 301. An alternating-current side of the inverting circuit 301 serves as an alternating-current side of the inverter 205.

Figure 9:
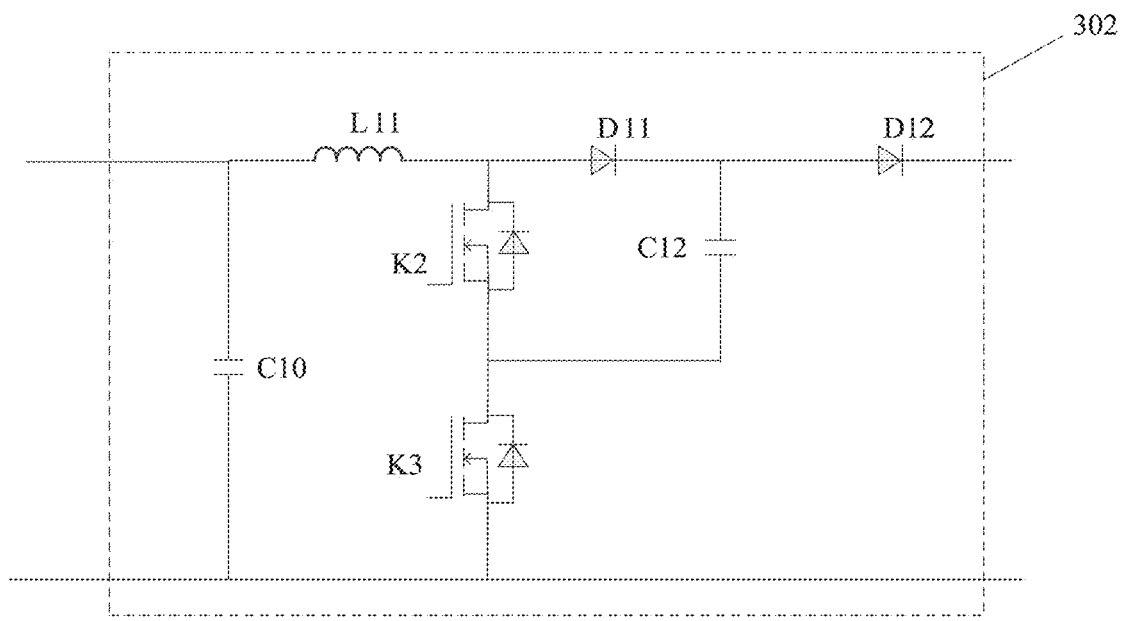
FIG. 9 is a schematic diagram of an inverting system in a photovoltaic rapid shutdown system according to another embodiment of the present disclosure.

The DC/DC circuit 302 may be implemented as a boost circuit, such as a basic boost circuit (as shown in FIG. 7) or a three-level boost circuit (such as a three-level flying-capacitor boost circuit as shown in FIG. 9).

As shown in FIG. 7, the DC/DC circuit 302 is the basic boost circuit. A terminal of an inductor L1 is connected to a terminal of an input capacitor Cin, and the common terminal between the two is connected to the positive output terminal of the starting voltage module 303. Another terminal of the inductor L1 is connected to a terminal of a switching transistor K1 and a terminal of a diode D1. A cathode of the diode D1 is connected to a positive terminal of the direct-current side of the inverting circuit 301. Another terminal of the switching transistor K1 is connected to another terminal of the input capacitor Cin, and the common terminal between the two is connected to the negative output terminal of the starting voltage module 303 and a negative terminal of the direct-current side of the inverting circuit 301.

Alternatively, as shown in FIG. 9 (in which only a structure of the DC/DC circuit 302 is shown), the DC/DC circuit 302 is the three-level flying capacitor boost circuit. A terminal of an inductor L11 is connected to a terminal of an input capacitor C10, and the common terminal between the two is connected to the positive output terminal of the starting voltage module 303. Another terminal of the inductor L11 is connected to a terminal of a switching transistor K2 and a terminal of a diode D11. A cathode of the diode D11 is connected to an anode of a diode D12 and a terminal of a flying capacitor C12. A cathode of the diode D12 is connected to the positive terminal of the direct-current side of the inverting circuit 301. Another terminal of the switching transistor K2 is connected to a terminal of a switching transistor K3 and another terminal of the flying capacitor C12. Another terminal of the switching transistor K3 is connected to another terminal of the input capacitor C10, and the common terminal between the two is connected to the negative output terminal of the starting voltage module 303 and the negative terminal of the direct-current side of the inverting circuit 301.

In practice, the starting voltage module 303 is configured to apply multiple levels of direct-current voltages separately on the direct-current bus under control of the inverter 205, or stop applying the multiple levels of direct-current voltages on the direct-current bus under control of the inverter 205. The energy storage system or the power grid supplies power to the starting voltage module 303, that is, an input terminal of the starting voltage module 303 is connected to the power grid or an energy storage battery in the energy storage system.

Figure 13:
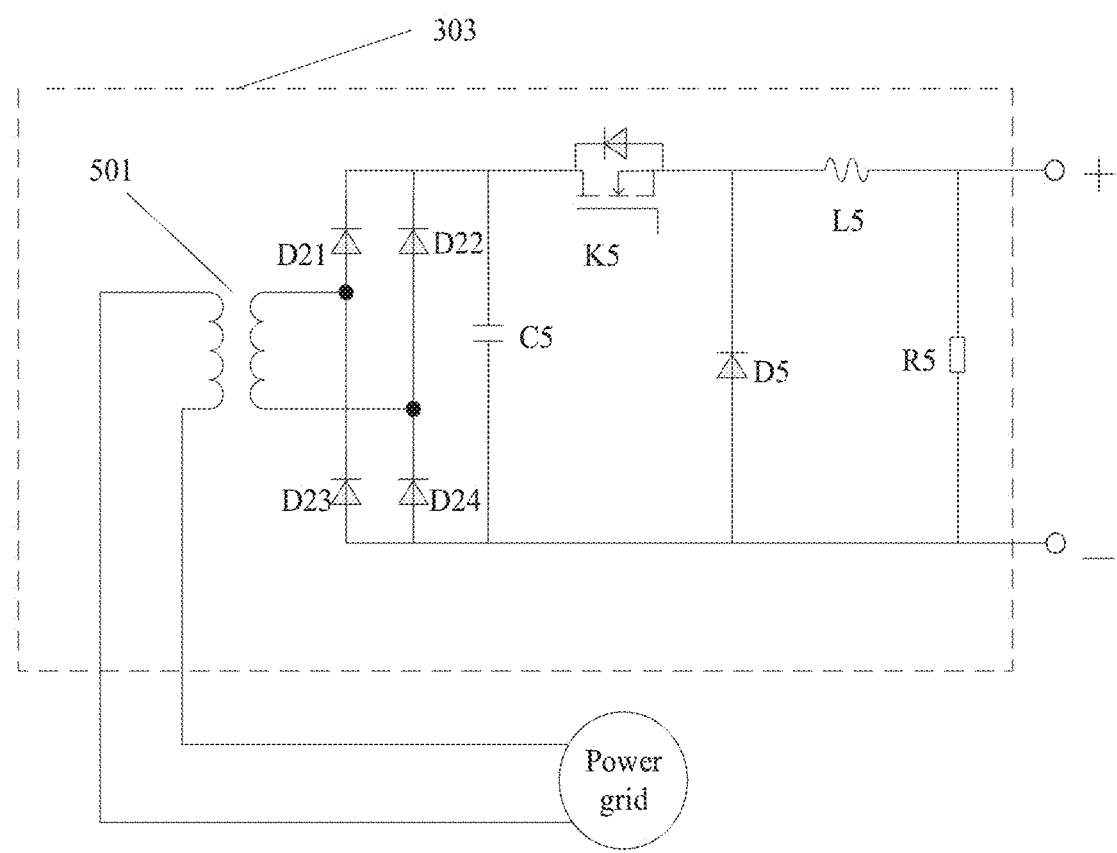
FIG. 13 is a schematic diagram of a starting voltage module in an inverting system according to an embodiment of the present disclosure.

In a case that the power grid supplies power to the starting voltage module 303, the starting voltage module 303 includes a transformer 501, a diode rectifier bridge (including a diode D21, a diode D22, a diode D23, and a diode D24 as shown in FIG. 13) and a starting DC/DC circuit (including a capacitor C5, a resistor R5, a switching transistor K5 and a diode D5 as shown in FIG. 13).

A primary winding of the transformer 501 is connected to the power grid. A secondary winding of the transformer 501 is connected to input terminals of the diode rectifier bridge. A positive output terminal and a negative output terminal of the diode rectifier bridge are connected to a side of the starting DC/DC circuit. The other side of the starting DC/DC circuit serves as the output terminals of the starting voltage module 303.

The transformer 501 is a power-frequency isolation transformer or a high-frequency isolation transformer. The starting DC/DC circuit is a buck circuit, a boost circuit, or a buck-boost circuit.

It is taken as an example that the starting DC/DC circuit is the buck circuit as shown in FIG. 13. A terminal of the primary winding of the transformer 501 is connected to a terminal of the power grid, and another terminal of the primary winding of the transformer 501 is connected to another terminal of the power grid. An anode of the diode D21 is connected to a terminal of the secondary winding of the transformer 501 and a cathode of the diode D23. An anode of the diode D22 is connected to another terminal of the secondary winding of the transformer 501 and a cathode of the diode D24. A cathode of the diode D21 is connected to a cathode of the diode D22, a terminal of the capacitor C5, and a terminal of the switching transistor K5. Another terminal of the switching transistor K5 is connected to a cathode of the diode D5 and a terminal of an inductor L5. Another terminal of the inductor L5 is connected to a terminal of the resistor R5, and the common terminal of the two serves as the positive output terminal of the starting voltage module 303. Another terminal of the capacitor C5 is connected to an anode of the diode D23, an anode of the diode D24, an anode of the diode D5 and another terminal of the resistor R5, and the common terminal of the above components serves as the negative output terminal of the starting voltage module 303.

The transformer 501 is a small step-down transformer. For example, the transformer 501 may convert an alternating-current grid voltage of 220V into an alternating-current voltage of 15V, and then the 15V alternating-current voltage is converted into a direct-current voltage via the diode rectifier bridge. Different direct-current voltage levels may be outputted by regulating a duty cycle of the switching transistor K5 in the buck circuit. The duty cycle of the switching transistor K5 is not limited herein and may depend on an actual situation, and all implementations fall within the protection scope of the present disclosure.

The inverter 205 may be configured to vary the alternating-current output power of itself rapidly during at least one cycle of the power grid, so as to introduce current fluctuations having a frequency higher than a preset frequency onto the direct-current bus. Alternatively, the inverter 205 may be configured to vary the alternating-current output power of itself slowly during at least one cycle of the power grid, so as to introduce current fluctuations having a frequency lower than a preset frequency onto the direct-current bus.

(2) The inverter 205 may be difficult to modify due to hardware or software limitations, that is, the inverter 205 may not be capable to introduce the voltage fluctuations and/or the current fluctuations. In such case, the direct-current voltage controller 214 is independently connected in the direct-current bus in order to address the above issue.

As shown in FIGS. 8 and 14, the direct-current voltage-control circuitry is the direct-current voltage controller 214 independently connected in the direct-current bus. As shown in FIG. 8, a positive terminal and a negative terminal of one side of the direct-current voltage controller 214 are connected to the positive line and the negative line, respectively, of the direct-current bus 203. A positive terminal and a negative terminal of the other side of the direct-current voltage controller 214 are connected to the positive terminal and the negative terminal, respectively, of the direct-current side of the inverter 205. The inverter 205 includes an internal controller and an inverting circuit. A direct-current side of the inverting circuit serves as the direct-current side of the inverter 205, and an alternating-current side of the inverting circuit serves as an alternating-current side of the inverter 205. As shown in FIG. 14, a positive output terminal of the direct-current voltage controller 214 is connected to a positive line of the direct-current bus 203, and a negative output terminal of the direct-current voltage controller 214 is connected to the positive terminal of the direct-current side of the inverter 205. The negative terminal of the direct-current side of the inverter 205 is connected to the negative line of the direct-current bus. The inverter 205 includes an internal controller and an inverting circuit. A direct-current side of the inverting circuit serves as the direct-current side of the inverter 205, and an alternating-current side of the inverting circuit serves as an alternating-current side of the inverter 205.

The direct-current voltage controller 214 communicates with the inverter 205 via a power line carrier, wireless communication, or wired communication. Other communication means may be additionally or alternatively utilized. A specific communication means is not limited herein and may depends on an actual situation, and all the implementations fall within the protection scope of the present disclosure. The direct-current voltage controller 214 is further configured to implement maximum power point tracking of the direct-current bus 203.

The assistant power to the direct-current voltage controller 214 is supplied by the inverter 205, the power grid, or the energy storage system, which is not limited herein. All implementations fall within the protection scope of the present disclosure.

In the foregoing embodiments, the shutdown device for the photovoltaic module is controlled to be turned on or off only through the direct-current voltage-control circuitry, and it is not necessary to provide a unit for transmitting a starting signal to the shutdown device. In addition, when disposing the unit for transmitting the starting signal in conventional technology, an additional device should be installed in the direct-current bus, and hence a larger direct-current combiner box or an additional direct-current combiner box should be provided for such installation, increasing a construction cost. In the foregoing embodiment, it is not necessary to install an additional device in the direct-current bus, thereby reducing the construction cost.

A photovoltaic rapid shutdown system is further provided according to an embodiment of the present disclosure. Reference is made to FIG. 10, in which the photovoltaic rapid shutdown system includes at least one shutdown system and at least one inverting system 204. The shutdown system includes a direct-current bus 203, at least N photovoltaic modules 201, and N shutdown devices 202 for the photovoltaic modules. N is a positive integer.

In the shutdown system, the N shutdown devices 202 are cascaded via output terminals thereof, and are correspondingly connected to output terminals of the photovoltaic modules 201 via input terminals of the N shutdown devices 202. A positive terminal of the cascaded shutdown devices 202 is connected to a positive terminal of a direct-current interface of the inverting system 204 via a positive line of the direct-current bus 203. A negative terminal of the cascaded shutdown devices 202 is connected to a negative line of the direct-current interface of the inverting system 204 via a negative line of the direct-current bus 203. Herein the sign "+" represents a positive terminal and the sign "−" represents a negative terminal.

Figure 11:
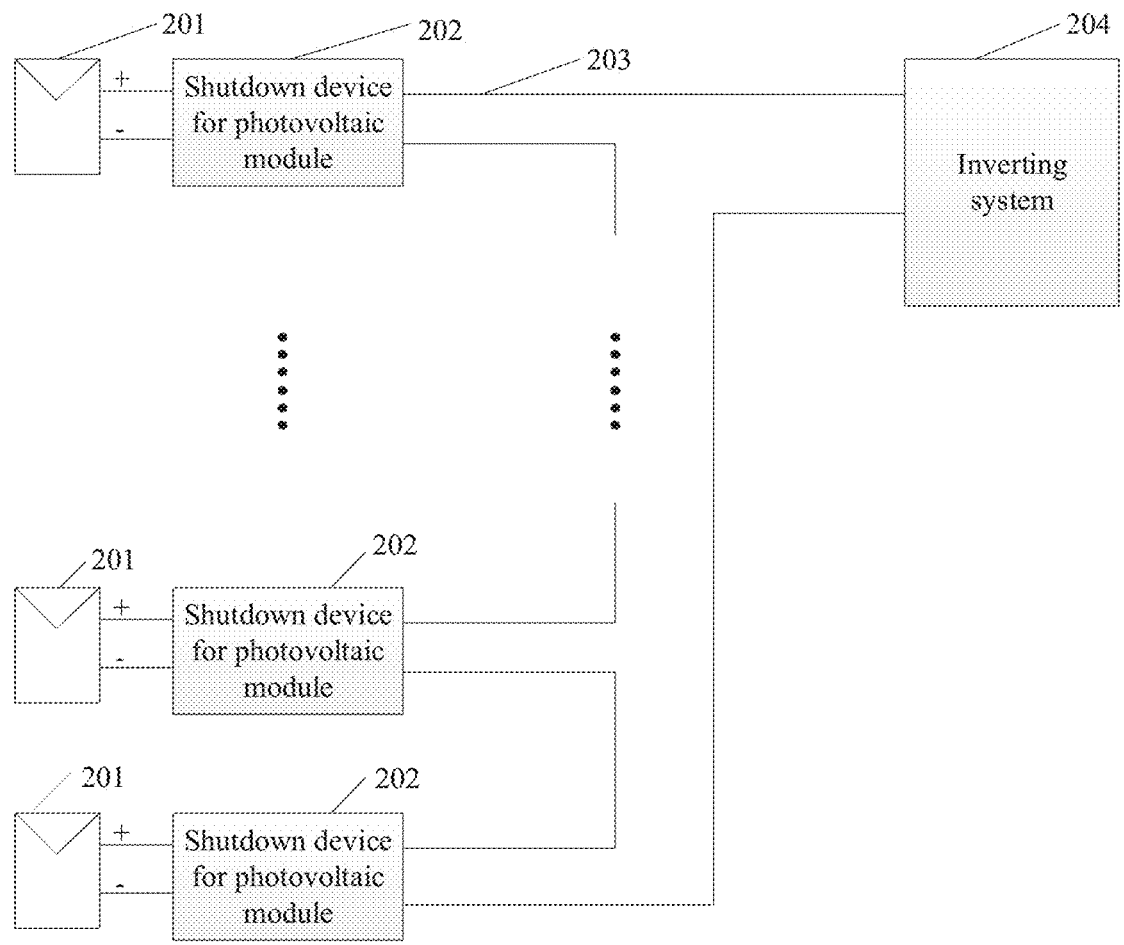
FIG. 11 is a schematic diagram of a photovoltaic rapid shutdown system according to another embodiment of the present disclosure.
Figure 12:
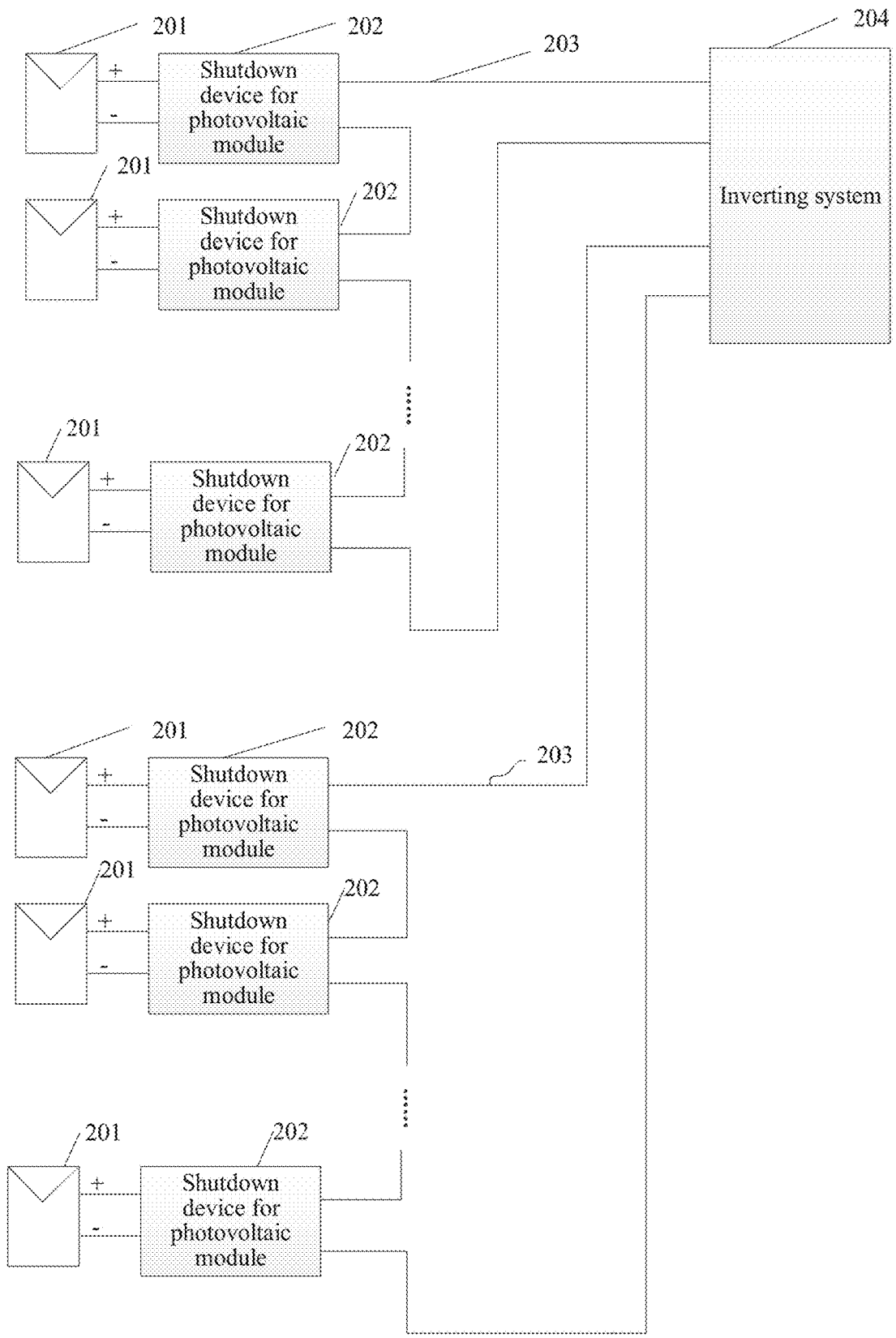
FIG. 12 is a schematic diagram of a photovoltaic rapid shutdown system according to another embodiment of the present disclosure.

Each shutdown device 202 may be connected to only one photovoltaic module 201 (as shown in FIG. 11), or may be connected to multiple photovoltaic modules 201 (for example, two photovoltaic modules 201 as shown in FIG. 10). A quantity of the shutdown system may be one (as shown in FIGS. 11 and 10) or more (for example, two shutdown systems as shown in FIG. 12). A quantity of the photovoltaic module 201 connected to each shutdown device 202 may be identical or different among one shutdown system. Being identical or different is not limited herein and may depend on an actual situation, and all implementations fall within the protection scope of the present disclosure.

A structure and an operation principle of the inverting system 204 may refer to the inverting system 204 in the forgoing embodiments, and are not repeated herein.

In the forgoing embodiments, coordinate control of the shutdown device 202 and the inverting system 204 implements startup of the photovoltaic rapid shutdown system(s), and hence the solutions have strong applicability to industry which provides both the shutdown device and the inverter. In addition, hardware costs of the shutdown device 202 and the inverting system 204 in the photovoltaic rapid shutdown system are low. Hence, the photovoltaic rapid shutdown system also has a low hardware cost.

Figure 6:
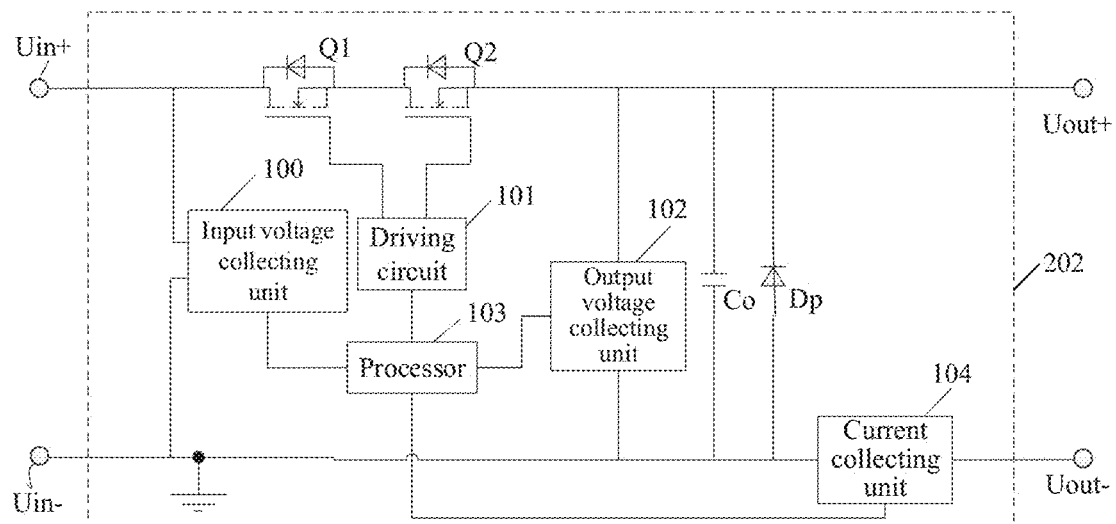
FIG. 6 is a schematic diagram of a shutdown device for a photovoltaic module according to an embodiment of the present disclosure.

Reference is made to FIG. 6, in which the shutdown device 202 includes a switching unit (including Q1 and Q2 as shown in FIG. 6), a driving circuit 101, a processor 103, an output stabilizing capacitor Co, a bypass diode Dp, and a parameter collecting unit (including an input voltage collecting unit 100, an output voltage collecting unit 102, and a current collecting unit 104 as shown in FIG. 6).

The switching unit is connected in a negative branch of the shutdown device 202 (where such case is not depicted in the drawings). Alternatively, the switching unit is connected in a positive branch of the shutdown device 202 (as shown in FIG. 6). In such case, an input terminal of the switching module Q1 serves as an input terminal of the switching unit, and is connected to a positive input terminal Uin+ of the shutdown device 202. An output terminal of the switching module Q1 is connected to an input terminal of the switching module Q2. An output terminal of the switching module Q2 serves as an output terminal of the switching unit. The switching unit is configured to turn on and turn off the shutdown device 202 under control of the processor 103.

Specifically, the switching unit includes at least one switching module (for example, two switching modules as shown in FIG. 6). In a case that there is only one switching module, an input terminal of the switching module serves as the input terminal of the switching unit, an output terminal of the switching module serves as the output terminal of the switching unit, and a control terminal of the switching module serves as a control terminal of the switching unit (where such case is not depicted in the drawings). In a case that a quantity of the switching modules is not 1, an input terminal of a branch, which is formed by serial connection of all switching modules, serves as the input terminal of the switching unit, an output terminal of the branch serves as the output terminal of the switching unit, and control terminals of all switching modules serve as control terminals of the switching unit. For example, in a case that there are two switching modules as shown in FIG. 6, the input terminal of the switching module Q1 serves as the input terminal of the switching unit, and is connected to the positive input terminal Uin+ of shutdown device 202. The output terminal of the switching module Q1 is connected to the input terminal of the switching module Q2. The output terminal of the switching module Q2 serves as the output terminal of the switching unit. The control terminals of the switching modules Q1 and Q2 serve as the control terminals of the switching unit.

Each switching module includes at least one switching transistor (for example, one switching transistor as shown in FIG. 6). In a case that a quantity of the switching transistors is greater than 1, all switching transistors are connected in parallel, in series, or in a hybrid of parallel and series. The switching transistor is a semiconductor switching device, for example, a metal-oxide-semiconductor field-effect transistor (MOSFET), or an insulated gate bipolar transistor (IGBT). The MOSFET is taken as an example in FIG. 6. A schematic diagram in which the switching transistor is the IGBT is not depicted herein. All implementations fall within the protection scope of the present disclosure.

The parameter collecting unit is configured to acquire the output parameter of the shutdown device 202 and output the acquired output parameter to the processor 103.

The parameter collecting unit includes an input voltage collecting unit 100, an output voltage collecting unit 102 and a current collecting unit 104.

The input voltage collecting unit 100 is connected between a positive input terminal and a negative input terminal of the shutdown device 202. Specifically, a positive input terminal and a negative input terminal of the input voltage collecting unit 100 are connected to the positive input terminal and the negative input terminal, respectively, of the shutdown device 202. An output terminal of the input voltage collecting unit 100 is connected to the processor 103. The input voltage collecting unit 100 is configured to collect an input voltage of the shutdown device 202 and report the collected input voltage to the processor 103. The negative input terminal of the shutdown device 202 may further be grounded.

The output voltage collecting unit 102 is connected between a positive output terminal and a negative output terminal of the shutdown device 202. Specifically, a positive input terminal and a negative input terminal of the output voltage collecting unit 102 are connected to the positive output terminal and the negative output terminal, respectively, of the shutdown device 202. An output terminal of the output voltage collecting unit 102 is connected to the processor 103. The output voltage collecting unit 102 is configured to collect an output voltage of the shutdown device 202 and report the collected output voltage to the processor 103.

The current collecting unit 104 is configured to collect an output current of the shutdown device 202. In a case that the switching unit is on, the bypass diode Dp is cut off, and a current acquired by the current collecting unit 104 is the output current of the photovoltaic module. In a case that the switching unit is off, the current acquired by the current collecting unit 104 is a current following through the bypass diode Dp.

Generally, the current collecting unit 104 has small impedance, and thus may be connected in various manners. Hereinafter illustrate are four manners of connecting the current collecting unit 104.

(1) Reference is made to FIG. 6. The current collecting unit 104 is connected in a negative branch of the shutdown device 202, and between an anode of the bypass diode Dp and a negative output terminal Uout− of the shutdown device 202. Specifically, a terminal of the current collecting unit 104 is connected to the negative output terminal Uout− of the shutdown device 202, and another terminal of the current collecting unit 104 is connected to the anode of the bypass diode Dp and a negative input terminal Uin− of the shutdown device 202.

(2) The current collecting unit 104 is connected in the negative branch of the shutdown device 202, and between the anode of the bypass diode Dp and a negative input terminal of the output voltage collecting unit 102. Specifically, a terminal of the current collecting unit 104 is connected to the anode of the bypass diode Dp and the negative input terminal Uin− of the shutdown device 202, and another terminal of the current collecting unit 104 is connected to the negative input terminal of the output voltage collecting unit 102 and the negative output terminal Uout− of the output end of the shutdown device 202. (Such case is not depicted in the drawings.)

(3) The current collecting unit 104 is connected in the positive branch of the shutdown device 202, and between a cathode of the bypass diode Dp and a positive output terminal Uout+ of the shutdown device 202. Specifically, a terminal of the current collecting unit 104 is connected to the positive output terminal Uout+ of the shutdown device 202, and another terminal of the current collecting unit 104 is connected to the cathode of the bypass diode Dp. (Such case is not depicted in the drawings.)

(4) The current collecting unit 104 is connected in the positive branch of the shutdown device 202, and between the cathode of the bypass diode Dp and the positive input terminal of the output voltage collecting unit 102. Specifically, a terminal of the current collecting unit 104 is connected to the positive output terminal Uout+ of the of the shutdown device 202 and the positive input terminal of the output voltage collecting unit 102, and another end of the current collecting unit 104 is connected to the cathode of the bypass diode Dp. (Such case is not depicted in the drawings.)

The anode of the bypass diode Dp is connected to the negative output terminal Uout− of the shutdown device 202, and the cathode of the bypass diode Dp is connected to the positive output terminal Uout+ of the shutdown device 202.

The bypass diode Dp is configured to implement a bypass of the shutdown device 202 when the shutdown device 202 is off.

Two terminals of the output stabilizing capacitor Co are connected to the positive output terminal and the negative output terminal of the shutdown device 202. As shown in FIG. 6, a terminal of the output stabilizing capacitor Co is connected to the positive output terminal Uout+ of the shutdown device 202, the cathode of the bypass diode Dp, the positive input terminal of the output voltage collecting unit 102, and the output terminal of the switching unit. Another terminal of the output stabilizing capacitor Co is connected to the negative input terminal of the output voltage collecting unit 102, the anode of the bypass diode Dp, and a terminal of the current collecting unit 104. The output stabilizing capacitor Co is configured to stabilize the output voltage of the shutdown device 202.

An output terminal of the processor 103 is connected to a control terminal of the switching unit via the driving circuit 101. The processor 103, in coordination with the parameter collecting unit, the driving circuit 101, and the switching unit, is configured to enable the shutdown device 202 to perform the corresponding steps in the method for controlling the photovoltaic rapid shutdown system in the foregoing embodiments. The steps include determining according to an output parameter of the shutdown device whether a voltage and/or a current on the direct-current bus connected to the shutdown device meets a preset condition, controlling the shutdown device to be turned on or maintaining the shutdown device being on in a case that the voltage and/or the current on the direct-current bus connected to the shutdown device meets the preset condition, and controlling the shutdown device to be turned off or maintaining the shutdown device being off in a case that the voltage and/or the current on the direct-current bus connected to the shutdown device does not meet the preset condition.

Specific process and operation principles of the shutdown device 202 of the above steps may refer to the corresponding part in the foregoing method embodiments, and are not repeated herein.

In the foregoing embodiments, the shutdown device 202 can turn on and turn off itself based on merely the output parameter collected by the parameter collecting unit in the shutdown device 202, and it is not necessary to utilize communication signals or provide an additional signal receiving module for receiving on/off communication signals outputted by the inverting system. Thereby, a hardware cost of the shutdown device 202 is reduced.

The embodiments of the present disclosure are described in a progressive manner, and each embodiment places emphasis on the difference from other embodiments. Therefore, one embodiment can refer to other embodiments for the same or similar parts. Since the systems disclosed in the embodiments corresponds to the methods disclosed in the embodiments, the description of the systems is simple, and reference may be made to the relevant part of the methods. The systems described in the foregoing embodiments are only schematic. A unit described as separated components may or may not be physically separated, and components depicted as units may or may not be physical, that is, the components may be located in one place or may be distributed among multiple network units. Some or all modules herein may be selected based on an actual requirement to implement an objective of the solution in the embodiments. Those skilled in the art can understand and implement the modules without any creative effort.

As further be appreciated by those skilled in the art, the units and algorithmic steps in the examples described according to the embodiments disclosed herein can be implemented in forms of electronic hardware, computer software or the combination of the both. To illustrate the interchangeability of the hardware and the software clearly, the components and the steps in the examples are described generally according to functions in the above description. Whether hardware or software is used to implement the functions depends on a specific application and design constraints for the technical solution. For each specific application, different methods may be used by those skilled in the art to implement the described function, and such implementation should not be considered to depart from the scope of this invention.

According to the description of the disclosed embodiments, those skilled in the art can implement or use the present disclosure. Various modifications made to these embodiments may be obvious to those skilled in the art, and the general principle defined herein may be implemented in other embodiments without departing from the spirit or scope of the present disclosure. Therefore, the present disclosure is not limited to the embodiments described herein but conforms to a widest scope in accordance with principles and novel features disclosed in the present disclosure.

The invention claimed is:

1. A method for controlling a photovoltaic rapid shutdown system, comprising:
    determining, by an inverting system in the photovoltaic rapid shutdown system, whether the photovoltaic rapid shutdown system is to enter a safe mode;
    introducing, by the inverting system, fluctuations onto a direct-current bus in the photovoltaic rapid shutdown system, in response to the photovoltaic rapid shutdown system being not to enter the safe mode;
    not introducing, by the inverting system, the fluctuations onto the direct-current bus in the photovoltaic rapid shutdown system, in a case that the photovoltaic rapid shutdown system being to enter the safe mode;
    determining, by a shutdown device for a photovoltaic module in the photovoltaic rapid shutdown system according to an output parameter of the shutdown device, whether an electrical parameter on the direct-current bus connected to the shutdown device meets a preset condition;
    controlling, by the shutdown device, the shutdown device to be turned on, or maintaining the shutdown device being on, in response to the electrical parameter on the direct-current bus connected to the shutdown device meeting the preset condition; and
    controlling, by the shutdown device, the shutdown device to be turned off, or maintaining the shutdown device being off, in response to the electrical parameter on the direct-current bus connected to the shutdown device not meeting the preset condition;
    wherein:
    the fluctuations comprise voltage fluctuations, and the electrical parameter comprises a voltage on the direct-current bus;
    the fluctuations comprise current fluctuations, and the electrical parameter comprises a current on the direct-current bus; or
    the fluctuations comprise voltage fluctuations and current fluctuations, and the electrical parameter comprises a voltage and a current on the direct-current bus;

wherein before introducing, by the inverting system, the fluctuations onto the direct-current bus in the photovoltaic rapid shutdown system, the method further comprises:

determining, by the inverting system, whether there is a fault in the photovoltaic rapid shutdown system;

performing the step of introducing, by the inverting system, the fluctuations onto the direct-current bus, in response to there being no fault in the photovoltaic rapid shutdown system; and performing the step of not introducing, by the inverting system, the fluctuations onto the direct-current bus, in response to there being the fault in the photovoltaic rapid shutdown system.

2. The method according to claim 1, wherein:

an interval between adjacent groups of the one or two of the voltage fluctuations and the current fluctuations, which are introduced by the inverting system onto the direct-current bus, is less than rapid shutdown duration of the photovoltaic rapid shutdown system; and/or duration of the inverting system not introducing the one or both of the voltage fluctuations and the current fluctuations onto the direct-current bus is greater than or equal to the rapid shutdown duration.

3. The method according to claim 1, wherein:

in the safe mode, each shutdown device in photovoltaic rapid shutdown system limiting power outputted by a corresponding photovoltaic module such that the voltage on the direct-current bus is less than a preset voltage for a first preset period.

4. The method according to claim 1, wherein the fault comprises at least one of:

a fault of a grid voltage, a fault of a grid frequency, a fault of grounding impedance, a fault of a direct-current arc flash, manual activation of a rapid shutdown control switch, or a fault of manual shutdown.

5. The method according to claim 1, wherein the preset condition comprises that a fluctuation greater than a corresponding threshold occurs within a second preset period, where the second preset period is less than rapid shutdown duration of the photovoltaic rapid shutdown system.

6. The method according to claim 5, wherein:

the fluctuations introduced by the inverting system onto the direct-current bus has a frequency greater than a preset frequency; and determining, by the shutdown device according to the output parameter, whether the electrical parameter on the direct-current bus connected to the shutdown device meets the preset condition comprises:

extracting, by the shutdown device from the output parameter, an effective value of an alternating-current ripple within the second preset period;

determining, by the shutdown device, whether the effective value is greater than or equal to a preset alternating-current ripple value;

determining that the electrical parameter on the direct-current bus connected to the shutdown device meets the preset condition, in response to the effective value being greater than or equal to the preset alternating-current ripple value; and determining that the electrical parameter on the direct-current bus connected to the shutdown device does not meet the preset condition, in response to the effective value being less than the preset alternating-current ripple value.

7. The method according to claim 5, wherein:

the fluctuations introduced by the inverting system onto the direct-current bus has a frequency smaller than a preset frequency; and determining, by the shutdown device according to the output parameter, whether the electrical parameter on the direct-current bus connected to the shutdown device meets the preset condition comprises:

determining, by the shutdown device, whether a difference between an average of the output parameter within a period previous to a moment, at which a fluctuation of the output parameter is detected, and an average of the output parameter within a period subsequent to the moment is greater than a corresponding preset current, wherein the moment is within the second preset period, and the output parameter is stable in the period previous to the moment and the period subsequent to the moment;

determining that the electrical parameter on the direct-current bus connected to the shutdown device meets the preset condition, in response to the difference being greater than the preset current; and determining that the electrical parameter on the direct-current bus connected to the shutdown device does not meet the preset condition, in response to the difference being less than or equal to the preset current.

8. The method according to claim 5, wherein:

the fluctuations comprise the voltage fluctuations, and the output parameter comprises an output voltage; and determining, by the shutdown device according to the output parameter, whether the electrical parameter on the direct-current bus connected to the shutdown device meets the preset condition comprises:

determining, by the shutdown device, whether a difference between the voltage previous to a moment, at which the fluctuation of the voltage is detected, and the voltage subsequent to the moment is greater than a preset voltage, where the moment is within the second preset period;

determining that the voltage on the direct-current bus meets the preset condition, in response to the difference being greater than the preset voltage; and determining that the voltage on the direct-current bus does not meet the preset condition, in response to the difference being less than or equal to the preset voltage.

9. An inverting system, comprising direct-current voltage-control circuitry and an inverter, wherein:

an output terminal of the direct-current voltage-control circuitry is connected to one or both of a positive line and a negative line of a direct-current bus;

a direct-current side of the inverter is connected to the positive line and the negative line of the direct-current bus in a photovoltaic rapid shutdown system; and the inverter in coordination the direct-current voltage-control circuitry is configured to enable the inverting system to:

determine whether the photovoltaic rapid shutdown system is to enter a safe mode; introduce fluctuations onto the direct-current bus in response to the photovoltaic rapid shutdown system being not to enter the safe mode; and not introduce the fluctuations onto the direct-current bus in response to the photovoltaic rapid shutdown system being to enter the safe mode;

wherein the fluctuations comprise one or both of voltage fluctuations and current fluctuations;

wherein before introducing, by the inverting system, the fluctuations onto the direct-current bus in the photovoltaic rapid shutdown system, the inverting system to:

determine, by the inverting system, whether there is a fault in the photovoltaic rapid shutdown system;

perform the step of introducing, by the inverting system, the fluctuations onto the direct-current bus, in response to there being no fault in the photovoltaic rapid shutdown system; and perform the step of not introducing, by the inverting system, the fluctuations onto the direct-current bus, in response to there being the fault in the photovoltaic rapid shutdown system.

10. The inverting system according to claim 9, wherein:
the direct-current voltage-control circuitry is a starting voltage module, of which an input terminal is connected to an energy storage system or a power grid, and
the starting voltage module is configured to apply multiple levels of direct-current voltages separately on the direct-current bus under control of the inverter, and stop applying the multiple levels of direct-current voltages on the direct-current bus under the control of the inverter.

11. The inverting system according to claim 10, wherein the input terminal of the starting voltage module is connected to the power grid, and the starting voltage module comprises a transformer, a diode rectifier bridge, and a starting DC/DC circuit, wherein:
a primary winding of the transformer is connected to the power grid;
a secondary winding of the transformer is connected to input terminals of the diode rectifier bridge;
a positive output terminal and a negative output terminal of the diode rectifier bridge are connected to a side of the starting DC/DC circuit; and
another side of the starting DC/DC circuit serves as output terminals of the starting voltage module.

12. The inverting system according to claim 11, wherein:
the direct-current voltage-control circuitry is a direct-current voltage controller independently connected in the direct-current bus, and
the direct-current voltage controller communicates with the inverter via a power line carrier, wireless communication, or wired communication.

13. The inverting system according to claim 12, wherein the direct-current voltage controller is further configured perform maximum power point tracking of the direct-current bus.

14. A photovoltaic rapid shutdown system, comprising:
at least one shutdown system, and
at least one inverting system according to claim 10, wherein:
each of the at least one shutdown system comprises a direct-current bus, at least N photovoltaic modules, and N shutdown devices for the at least N photovoltaic modules, N being a positive integer; and
in each of the at least one shutdown system:
the N shutdown devices are cascaded via output terminals of the N shutdown devices and are correspondingly connected to output terminals of the at least N photovoltaic modules via input terminals of the N shutdown devices;
a positive terminal of the cascaded shutdown devices is connected to a positive terminal of a direct-current interface of a corresponding inverting system of the N inverting systems via a positive line of the direct-current bus; and a negative terminal of the cascaded shutdown devices is connected to a negative terminal of the direct-current interface via a negative line of the direct-current bus.

15. The photovoltaic rapid shutdown system according to claim 14, wherein each of the N shutdown devices comprises a switching unit, a driving circuit, a processor, a parameter collecting unit, a bypass diode, and an output stabilizing capacitor;
the switching unit is connected in a positive branch or a negative branch of the shutdown device, and is configured to turn on and turn off said shutdown device under control of the processor;
the parameter collecting unit is configured to collect an output parameter of said shutdown device and report the collected output parameter to the processor;
the bypass diode is configured to implement a bypass of said shutdown device when said shutdown device is turned off;
the output stabilizing capacitor is configured to stabilize an output voltage of said shutdown device;
an output terminal of the processor is connected to a control terminal of the switching unit via the driving circuit; and
the processor, in coordination with the parameter collecting unit, the driving circuit, the output stabilizing capacitor and the switching unit is configured to enable said shutdown device to:
determine according to the output parameter of said shutdown device whether an electrical parameter on the direct-current bus connected to said shutdown device meets a preset condition;
control said shutdown device to be turned on or maintain said shutdown device being on in response to the electrical parameter on the direct-current bus connected to said shutdown device meeting the preset condition; and
control said shutdown device to be turned off or maintain the shutdown device being off in response to the electrical parameter on the direct-current bus connected to said shutdown device not meeting the preset condition;
wherein the electrical parameter comprises a voltage on the direct-current bus when the at least one inverting system introduces voltage fluctuations on the direct-current bus, the electrical parameter comprises a current on the direct-current bus when the at least one inverting system introduces current fluctuations on the direct-current bus, and the electrical parameter comprises a voltage and a current on the direct-current bus when the at least one inverting system introduces both voltage fluctuations and current fluctuations on the direct-current bus.

16. The photovoltaic rapid shutdown system according to claim 15, wherein:
the parameter collecting unit comprises an output voltage collecting unit and an output current collecting unit;
the output current collecting unit is configured to collect an output current of said shutdown device; and
the output voltage collecting unit is configured to collect an output voltage of said shutdown device.

17. The photovoltaic rapid shutdown system according to claim 16, wherein the parameter collecting unit further comprises an input voltage collecting unit configured to collect an input voltage of said shutdown device.

18. The photovoltaic rapid shutdown system according to claim 17, wherein:
- the current collecting unit is connected in a negative branch of said shutdown device and between an anode of the bypass diode and a negative output terminal of said shutdown device;
- the current collecting unit is connected in the negative branch of said shutdown device and between the anode of the bypass diode and a negative input terminal of the output voltage collecting unit;
- the current collecting unit is connected in a positive branch of said shutdown device and between a cathode of the bypass diode and a positive output terminal of said shutdown device; or
- the current collecting unit is connected in the positive branch of said shutdown device and between the cathode of the bypass diode and a positive input terminal of the output voltage collecting unit.

19. The photovoltaic rapid shutdown system according to claim 15, wherein the switching unit comprises at least one switching module;
- in response to a quantity of the at least one switching module being equal to 1, an input terminal of the switching module serves as an input terminal of the switching unit, an output terminal of the switching module serves as an output terminal of the switching unit, and a control terminal of the switching module serves as a control terminal of the switching unit; and
- in response to a quantity of the at least on switching module being not equal to 1, an input terminal of a branch formed by all switching modules which are connected in series serves as the input terminal of the switching unit, an output terminal of the branch serves as the output terminal of the switching unit, and control terminals of all switching modules serve as control terminals of the switching unit.

\* \* \* \* \*